US012177040B2

(12) United States Patent
Wyas et al.

(10) Patent No.: US 12,177,040 B2
(45) Date of Patent: Dec. 24, 2024

(54) WIRELESS PROGRAMMING DEVICE AND METHODS FOR MACHINE CONTROL SYSTEMS

(71) Applicant: Connections Design, LLC, Springfield, MO (US)

(72) Inventors: Kevin Edward Wyas, Springfield, MO (US); Charles Lee, Omaha, NE (US)

(73) Assignee: Connections Design, LLC, Springfield, MO (US)

( * ) Notice: Subject to any disclaimer, the term of this patent is extended or adjusted under 35 U.S.C. 154(b) by 386 days.

(21) Appl. No.: 17/652,629

(22) Filed: Feb. 25, 2022

(65) Prior Publication Data
US 2022/0182261 A1    Jun. 9, 2022

Related U.S. Application Data

(63) Continuation of application No. 16/380,157, filed on Apr. 10, 2019, now Pat. No. 11,296,906.

(51) Int. Cl.
*B60W 40/12* (2012.01)
*G06F 9/54* (2006.01)
(Continued)

(52) U.S. Cl.
CPC .............. *H04L 12/46* (2013.01); *G06F 9/544* (2013.01); *G06F 9/546* (2013.01); *G06F 16/903* (2019.01); *H04L 2012/40215* (2013.01)

(58) Field of Classification Search
CPC ........... H04L 12/46; H04L 2012/40215; H04L 12/40169; H04L 2012/40273; G06F 9/544;
(Continued)

(56) References Cited

U.S. PATENT DOCUMENTS 6,954,797 B1    10/2005   Takeda et al.
11,055,934 B1 *  7/2021   Just .................. B60C 11/246
(Continued)

FOREIGN PATENT DOCUMENTS

JP            3975549 B2 *   9/2007
KR      20080007701 A *   1/2008   ............. B60K 37/00
(Continued)

OTHER PUBLICATIONS

Pages, Youtube video clip entitled, "AlfaOBD: What is it? If You Have a RAM, You Need This-Change Dealer Features Yourself!," uploaded on Dec. 23, 2018 by user Charles Page https://www.youtube.com/watch?v=PqxwfWFTAOc (Year: 2018).*
(Continued)

*Primary Examiner* — Daniel M. Robert
(74) *Attorney, Agent, or Firm* — Shook, Hardy & Bacon L.L.P.

(57) ABSTRACT

Embodiments for wirelessly programming a control system of a machine, such as a vehicle, are provided. As machines typically include an intricate collection of electronic devices that communicate to one another via a complex network, the ability to reliably program such devices over a wireless connection is extremely unreliable due to network limitations or requirements, such as defined communication protocols or standards. Embodiments relate to a machine interfacing device that can wirelessly communicate with a client device that serves as both a diagnostics and programming interface. The machine interfacing device, physically coupled to the control system, can independently convert and intelligently manage communications to and from electronic devices of the machine control system. The client device can determine compatibility between the machine and the machine interfacing device, and retrieve compatible programming messages from a remote server, thereby
(Continued)

expanding the overall utility of the machine interfacing device.

19 Claims, 7 Drawing Sheets

(51) Int. Cl.
*G06F 16/903* (2019.01)
*H04L 12/40* (2006.01)
*H04L 12/46* (2006.01)

(58) Field of Classification Search
CPC ... G06F 9/546; G06F 16/903; G05B 19/0426; B60W 2530/18; B60W 2530/20; B60W 40/12; B60L 3/104
See application file for complete search history.

(56) References Cited

U.S. PATENT DOCUMENTS

| | | |
|---|---|---|
| 2012/0131324 A1 | 5/2012 | Ansari et al. |
| 2016/0021013 A1 | 1/2016 | Vasseur et al. |
| 2019/0286886 A1 | 9/2019 | Singh et al. |
| 2019/0327644 A1 | 10/2019 | Gao et al. |
| 2020/0079397 A1* | 3/2020 | Harichandan ......... H04W 4/024 |
| 2022/0182261 A1* | 6/2022 | Wyas ................. G06F 16/903 |

FOREIGN PATENT DOCUMENTS

| | | | |
|---|---|---|---|
| KR | 10091811981 | * | 3/2008 |
| KR | 20190036734 A | * | 9/2017 |

OTHER PUBLICATIONS

Pages, Youtube video clip entitled, "Ram 13-18 TPMS: Change The TPMS Setting Yourself With Alfa OBD," uploaded on Dec. 23, 2018 by user Charles Page https://www.youtube.com/watch?v=fEIOT7cd9hl (Year: 2018).*

Redheadhunter21, (Redheadhunter21, "Tire size change alfaOBD," comment posted to RamForum.com on Nov. 9, 2018, https://www.ramforum.com/threads/tire-size-change-alfaobd.129984/), hereinafter Redheadhunter21 (Year: 2018).*

ISO 15765-2, "Road vehicles—Diagnostic communication over Controller Area Network (DoCAN) | Part-2 : Transport protocol and network layer services", Wikipedia, Retrieved from Internet URL : https://en.wikipedia.org/wiki/ISO_15765-2, accessed on May 20, 2022, pp. 3.

* cited by examiner

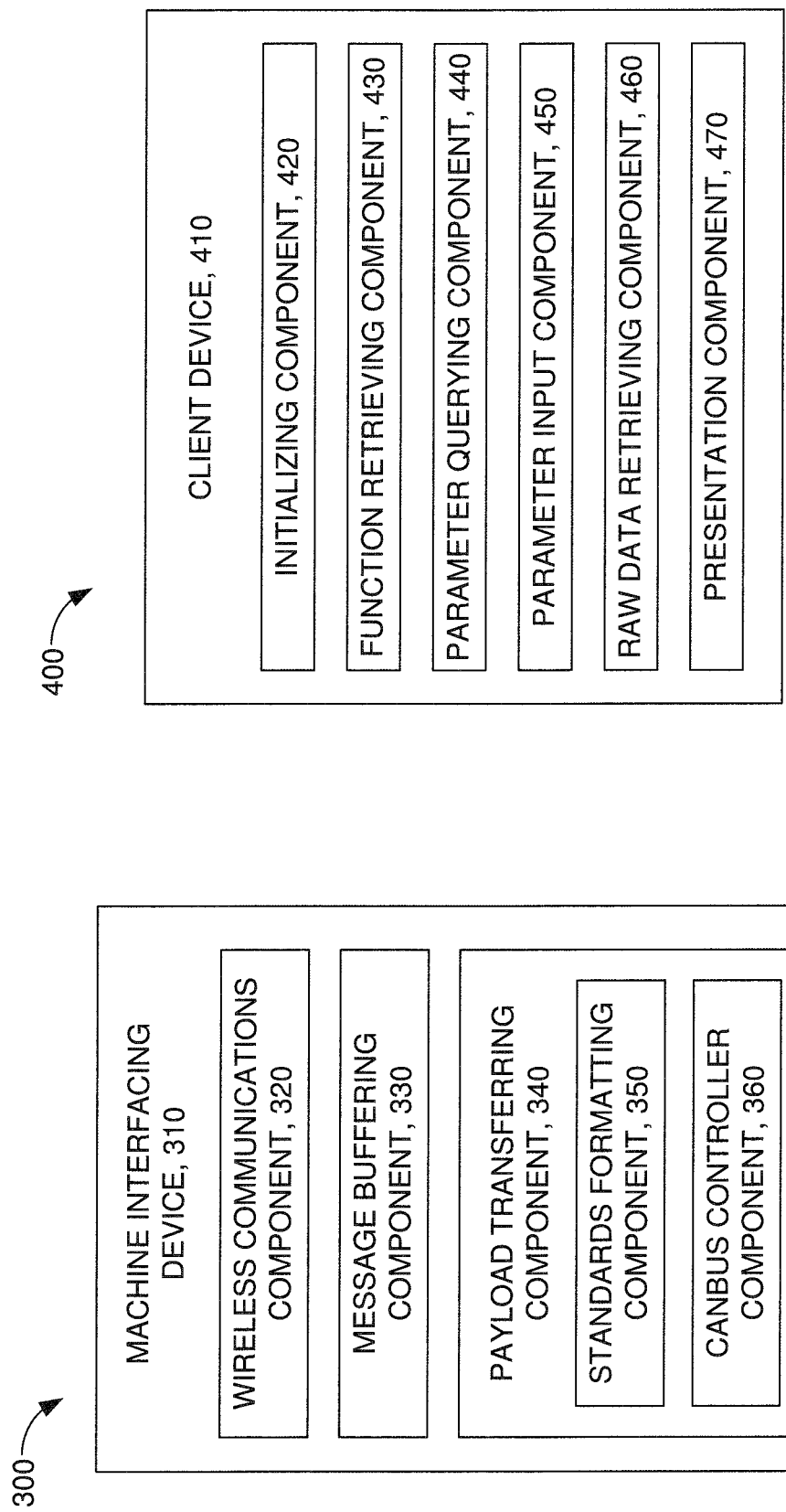

WIRELESS PROGRAMMING DEVICE AND METHODS FOR MACHINE CONTROL SYSTEMS

CROSS-REFERENCE TO RELATED APPLICATIONS

The present application is a continuation of U.S. application Ser. No. 16/380,157, filed Apr. 10, 2019, the contents of which are incorporated herein by reference.

BACKGROUND

A variety of devices are employed in machinery maintenance or diagnostic operations that facilitate the determination of machine diagnostics information, or even the modification of machine settings. Many of such devices available are machine interfacing devices that physically plug into a port of a machine, such as an on-board diagnostics (OBD) port. Utilizing such a port, a machine interfacing device can request and collect diagnostics information from a complex control system of the machine, which can include many different electronic control units. As these electronic control units are interconnected through a complex system of multiplex electrical wiring, standardized protocols have been designed to facilitate the broadcasting of messages there between and throughout the electrical wiring system. These protocols generally define very specific requirements for properly interfacing with machine control systems, for retrieving, updating or modifying machine settings. While certain hardwired machine interfacing devices have been designed to properly interface with machine control systems, such devices are typically expensive and limited to manufacturer-specific operations.

SUMMARY

Embodiments of the present invention relate to systems and techniques for wirelessly updating a control system of a machine. More specifically, systems and methods are disclosed relating to a machine interfacing device that can wirelessly interface with a computing device and independently manage two-way communications of multi-part messages between the computing device and a control system of a machine. As conventional devices and techniques are limited in application, disclosed embodiments introduce new and improved techniques for wirelessly interfacing with various machine control systems without concerns relating to latency or limited compatibility due to manufacturer specifications. As such, disclosed herein are embodiments relating to a wireless machine interfacing system. Additional embodiments are further disclosed relating to techniques for managing the wireless delivery and receipt of multi-part payloads to and from a machine control system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a block diagram illustrating an exemplary implementation of a machine interfacing device in accordance with some embodiments of the present invention;

FIG. 4 is a block diagram illustrating an exemplary implementation of a client device in accordance with some embodiments of the present invention;

DETAILED DESCRIPTION

Figure 1:
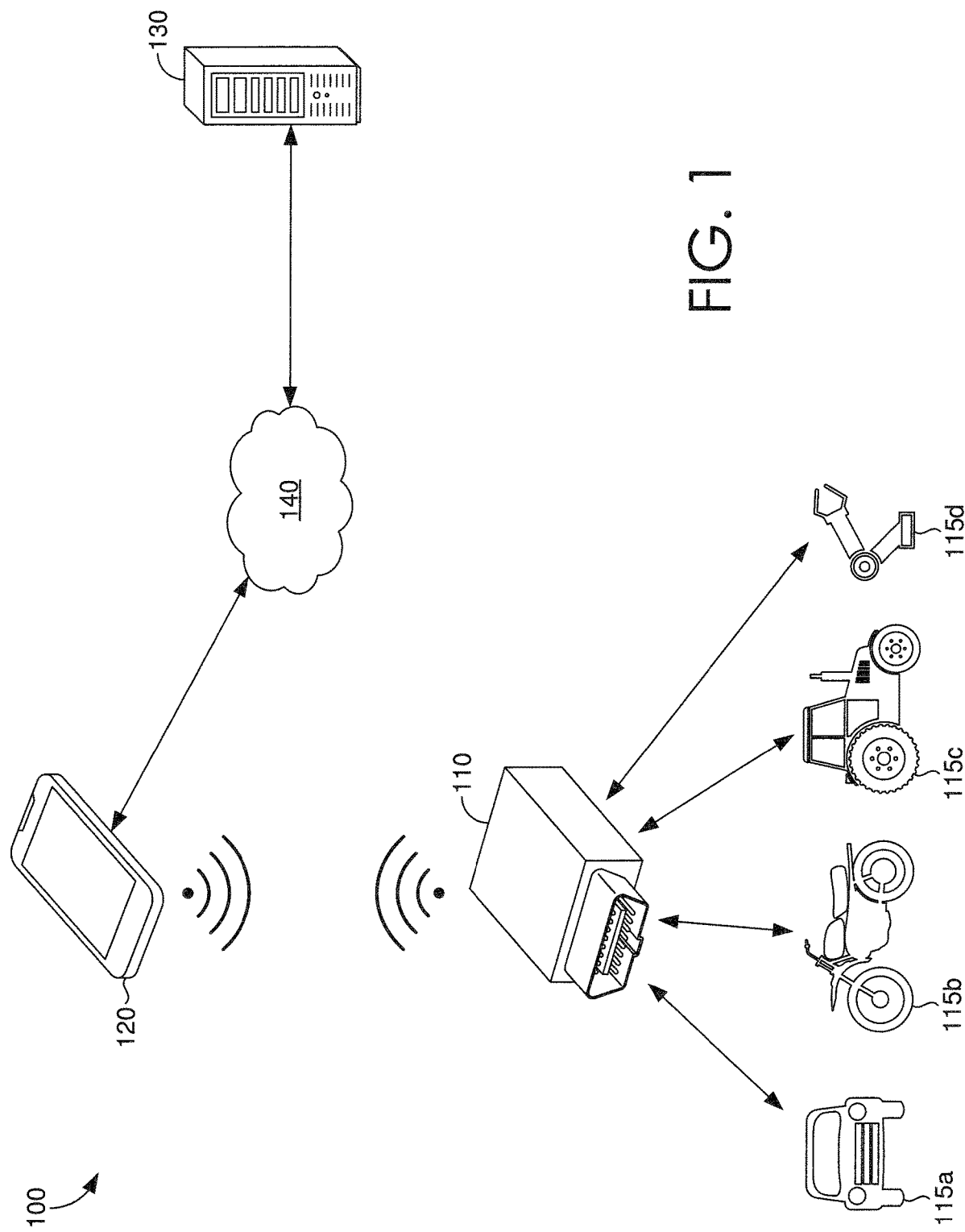
FIG. 1 is an exemplary operating environment of wireless machine-interfacing and communications management system described in accordance with some embodiments of the present invention.

A variety of machines, such as automobiles, generally include a complex network of electronics that each serve a specific purpose to overall functionalities and features. Certain machine interfacing devices can physically plug into a port of a machine (e.g., an on-board diagnostics ("OBD") port) and request and/or collect diagnostics information from electronic control units ("ECUs") of a machine's control system.

ECUs can communicate over an interconnecting network bus. A controller area network bus (CANBUS) is one non-limiting example of such a network bus. Generally speaking, ECUs can broadcast messages throughout the control system via the network bus without a host computer. Messages broadcast over the network bus generally must comply with standardized protocols, designed for an array of multiplex electrical wiring that interconnects the ECUs.

Certain protocols may define very specific requirements for properly interfacing with machine control systems, particularly for updating or modifying machine settings. For instance, portions of larger messages (e.g., messages exceeding a threshold size) must be communicated in a specific sequence and within a defined period of time, in accordance with flow control messages received from the control system. One non-limiting example of a larger message exceeding a threshold size is a message having multiple portions that can be independently communicated (e.g., a multi-frame message). Undesired latencies between communicated portions of such larger messages can result in failed attempts to update or modify machine settings, among other things.

While certain hardwired machine interfacing devices can overcome these latency issues, such hardwired devices are oftentimes extremely costly and limited to manufacturer specifications. Wireless machine interfacing devices are generally limited to the exchange of smaller messages, or messages not exceeding the threshold size. One non-limiting example of a smaller message not exceeding the threshold size is a single-frame message. Wireless machine interfacing devices are generally limited to such smaller messages, as the exchange of larger messages over wireless communications typically fails due to the latencies associated with wireless communications or limitations of available products. In other words, wireless solutions have yet to facilitate consistent communications of larger messages between remote computing devices and a machine's control system via a wireless machine interfacing device in accordance with communications limitations, such as protocol requirements of the network bus, and the like. As such, there is a need for devices and techniques that facilitate reliable wireless communications to and from a machine control system; one that can not only overcome latency issues inherent in wireless communications, but can also provide universal interoperability between various manufacturer specifications.

Embodiments of the present invention are generally directed to a system and related techniques for wirelessly programming or updating attributes of a control system, or one or more ECUs, of a machine to overcome communications limitations and/or accommodate protocol requirements, among other things. More specifically, in some embodiments, a machine interfacing device is physically coupled to a communications port of a network bus (e.g., a CANBUS) associated with a machine control system. The machine interfacing device receives, via a wireless connection, a message (e.g., a message exceeding a threshold size, or a multi-frame/multi-part message) from a computing device that is separate from the machine interfacing device. In some aspects, one or more portions of the received message can include identifiers that define an order or other protocol-specific information relevant to the message or corresponding portion of the message. The machine interfacing device includes a memory and stores the message into a memory buffer. The machine interfacing device selects a first portion of the stored message based on a corresponding identifier, and communicates the selected first portion to the network bus via the communications port. In response to the communicated first portion, the machine interfacing device receives a flow control message generated by the machine control system (e.g., one or more ECUs thereof). The machine interfacing device parses the received flow control message to determine the communication specification for the remainder of the stored message, and in accordance with the determined communication specification, communicates each consecutive portion of the message to the machine control system. The machine control system is configured to receive the subsequent portions of the message so long as the portions are communicated from the machine interfacing device in accordance with the requirements (e.g., communication specification) defined in the generated flow control message. Based on determining that the message has been communicated to the machine control system, the machine interfacing device can generate a notification that is communicated to the computing device via the wireless connection.

In some embodiments, a client device initiates a wireless communication session with a machine interfacing device that is physically coupled to a communications port of a network bus (e.g., CANBUS) associated with a control system of a machine. In some aspects, the client device can establish a communication session with remote server device via a network, such as the Internet. The client device generates a request message to retrieve a unique identifier associated with the machine, and communicates the generated request message to the machine interfacing device. The client device wirelessly receives the unique identifier, which is provided to the machine interfacing device from the machine control system based on the generated request message. The client device obtains a corresponding set of programming functions determined compatible with the machine interfacing device based on the received unique identifier from the remote server device. The client device generates a request message based on the determined compatible set of programming functions, and wirelessly sends the generated request message to the machine control system via the machine interfacing device. In some aspects, the client device provides for display a set of parameters, stored in one or more memories of the machine control system and retrieved by the machine interfacing device based on the generated request message. The client device receives an input to modify any portion of the set of parameters, and wirelessly communicates a dataset, which can include the modified set of parameters or a programming message, to the machine interfacing device. In this way, the machine interfacing device can either generate the programming message from the modified set of parameters from the communicated dataset and/or communicate the programming message to the machine interfacing device in accordance with a set of requirements (e.g., communication specification) defined in a flow control message sent from the machine control system to the machine interfacing device. The client device wirelessly receives a notification generated by the machine interfacing device and provides for display an indication that the modified portion of the set of parameters is successfully updated and stored by the machine control system.

In some embodiments, a server device establishes a communication session with a client device via a network, such as the Internet. The server device is coupled to a memory, such as a database, that stores a plurality of unique identifiers and a set of programming functions associated with each unique identifier. The server device receives a unique identifier from the client device via the network, and generates a query based on the received unique identifier to search the stored plurality of unique identifiers. The server device selects the associated set of programming functions and communicates it to the client device. The server device receives one or more messages from the client device, which can include messages (e.g., CAN messages) generated by the machine control system and retrieved by the client device via the machine interfacing device. In some further embodiments, the server device encodes or decodes messages received from the client device, stores the messages to the database in association with the unique identifier, and/or provides the client device with any of the encoded, decoded, and/or stored messages via the network. As described, the client device can then wirelessly communicate with the machine interfacing device to program the machine control system, among other things.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 in FIG. 1 can include a machine interfacing device 110, a client device 120, and/or a server device 130. In various embodiments, the machine interfacing device 110 can include a connector that physically plugs into a port of a machine, such as machines 115A, 115B, 115C, 115D, by way of non-limiting example. In accordance with various embodiments, a machine such as machines 115A-D can include a vehicle (e.g., car, motorcycle), an airplane, a tractor, a truck, a piece of construction equipment, heavy machinery, a robot, a hydraulic machine, or any other type of vehicle or machine without limitation. In some embodiments, the port of the machine can include a diagnostics port (e.g., an OBD-II port) coupled to a network bus (e.g., CANBUS) of a control system associated with the machine. The control system can comprise one or more electronic control units (ECUs) that can respectively include a memory, a microprocessor, or other components that facilitate the control of a particular module or feature of the machine. In some embodiments, each ECU can comprise a computing device, such as computing device 800 of FIG. 8, whereby the ECUs are interconnected to one another via the network bus. In some aspects, each ECU can store in an associated memory (i.e., a memory module) a respective set of parameters, settings, or the like. In some further aspects, each ECU can receive messages via the network bus, or generate messages to broadcast via the network bus based on received messages, among other things.

The machine interfacing device 110 can wirelessly communicate with a client device, such as client device 120. The wireless communications there between can be facilitated via peer-to-peer technologies (e.g., Bluetooth, LoRa, direct Wi-Fi, ZigBee, radio, infrared, or any other peer-to-peer wireless technology) or a server-based network (e.g., LAN, WAN, Wi-Fi, the Internet, telecommunications network), such as network 140. In some embodiments, the machine interfacing device 110 can comprise a computing device, such as computing device 800 of FIG. 8. The system can also include a client device, such as client device 120, which can initiate and establish a wireless communications session with the machine interfacing device 110. The client device 120 can obtain or generate messages for wireless communication to the machine interfacing device 110, and wirelessly receive communications (e.g., messages, notifications, machine parameters, machine settings, or other electronic information) from the machine interfacing device 110. In some aspects, the wireless communications received from the machine interfacing device 110 can be generated by the machine interfacing device 110 or the control system associated with the machine to which the machine interfacing device 110 is connected.

The client device 120 can further communicate with a remote server device, such as server device 130. The client device 120 can initiate a communications session with the remote server device via a network, such as network 140. In various embodiments, the client device 120 can retrieve messages generated by the control system of a machine and collected by the machine interfacing device 110. In some aspects, these messages can be retrieved based on request messages generated by the client device 120 and sent to a control system associated with a machine via the machine interfacing device 110. In various embodiments, the client device 120 can communicate messages, generated by the machine control system and collected by the machine interfacing device, to the server device 130. The server device 130 can generate queries to search databases based on communications received from the client device 120; communicate generated search results (e.g., stored parameters, programming functions) to the client device 120; or store messages, settings, parameters, or programming functions associated with a machine (or unique identifier thereof) or set of machines, among other things. In some embodiments, the server device 130 can provide a controlled system, such that the client device 120 can only employ the machine interfacing device 110 on permitted or authorized machines. By way of example, the server device 130 can include an authentication system that enables a client device 120 associated with a user account or profile to register specific machines or unique identifiers associated with the machines. In this way, various restrictions to the user account or profile can be enforced, such that the server device 130 will only provide the client device 120 with services (e.g., storage of parameters, providing programming functions) for machines to which the client device 120 has registered in association with the user account or profile. In some embodiments, the client device 120 and/or server device 130 can comprise a computing device, such as computing device 800 of FIG. 8.

For purposes of background, an exemplary overview of how communications are facilitated throughout a network bus of a machine control system is provided. In various embodiments, any portion of the machine control system (e.g., an ECU) can be designed to send and receive data packets (e.g., messages, message portions, frames) in accordance with a defined or determinable set of requirements, which can include a predefined communications standard or protocol, such as the ISO 15765-2 CAN communications standard by way of non-limiting example. More specifically, and by way of non-limiting example, an ECU can store one or pieces of data (e.g., one or more sets of parameters) into a memory associated with the ECU, whereby a piece of data can correspond to a variable or set of variables that affects a functionality or operation (for which the ECU is responsible for controlling) of the machine. In accordance with some embodiments, and due to a set of requirements or other limitations defined by the predefined communications standard or protocol, the ECU can only generate and broadcast, or receive and interpret, messages or message portions (e.g., frames) up to a threshold size (e.g., 7 bytes) at any given time. This threshold size can correspond to a size of a data packet or dataset that can be broadcast throughout the network bus and recognized and stored by the ECU or a machine interfacing device coupled to the network bus. If, however, a piece of data (e.g., message, message portion) is greater than the threshold amount of data (e.g., 8 or more bytes), the set of requirements or a predefined communications standard or protocol may require that the piece of data be communicated throughout the network bus in multiple parts (each being no greater than the threshold size). In various embodiments, a single piece of data exceeding the threshold size must be communicated through the network bus in multiple parts, the collective parts being sometimes referenced herein as a "larger" message (e.g., a message exceeding a threshold size, a multi-frame message). On the other hand, a single piece of data that is no larger than the threshold size can be communicated in a single part, sometimes referenced herein as a "smaller" message (e.g., a message not exceeding a threshold size, a single-frame message).

In various embodiments, a message exceeding the threshold size can include a series of portions that are sequentially ordered, each having a unique portion identifier associated therewith. Various portions of the machine control system (e.g., one or more ECUs thereof) can generate such messages (e.g., in response to a received request for a piece of data) or receive such messages (e.g., in response to a received request for writing a piece of data), particularly if the piece of data that is requested to be read from or written to an associated memory is greater than the threshold size. In various embodiments, the portion of the machine control system that is responsible for generating and/or broadcasting messages, or on the other hand receiving and/or storing messages, can define a corresponding set of requirements in which the message must be broadcast or received, respectively. In some embodiments, this set of requirements can be defined in a first portion of a message generated by the portion of the machine control system.

By way of a first non-limiting example, a portion of the machine control system (e.g., an ECU) may receive a request message (e.g., a single frame message) from a machine interfacing device, such as machine interfacing device 110, that includes a request to read a piece of data stored in a memory associated with the ECU. In response to the received request message, the ECU can determine that the requested piece of data exceeds the threshold size or otherwise cannot be communicated as a "smaller" message (e.g., single frame message). In some embodiments, the ECU can responsively generate a "larger" message (e.g., a multi-portion, multi-frame, or threshold size exceeding message) based on the stored piece of data. In some aspects each portion of a multi-portion message can be sized no larger than the threshold size. In some aspects, the "larger" message can be generated to include a first portion (e.g., a first frame), which can include one or more attributes, including an indication that the message as a whole (e.g., all portions together) is a larger (e.g., multi-portion, multi-frame, threshold size exceeding) message, and/or can include a value for the total number of bytes of the message to be transmitted. The client device can then respond to the first portion with a "flow control" message, which is typically broadcast in response to the first portion of the message. In various embodiments, the flow control message can indicate one or more attributes, including a transmission rate and a number of message portions allowed for the transmission, among things. Once the flow control message is received by the ECU of the machine control system, the ECU can broadcast the remaining generated message portions throughout the network bus, which can then be received by the client device.

In accordance with some embodiments, a set of requirements can be defined in a flow control message, such as the number of message portions that can be broadcast before another flow control message is required in response to the broadcasted first message portion and/or any subsequently broadcasted portions of the "larger" message, or a duration/time period (e.g., separation time) in which any subsequently broadcasted message portions can be expected to be broadcast (e.g., by the ECU). To this end, and by way of example, the machine interfacing device 110 must receive the first portion of the message, broadcast a flow control message so that the machine control system can parse and interpret the flow control message to understand the set of requirements and react (e.g., by generating and broadcasting the remaining message portions in accordance with or within the specified constraints) in response to the received flow control message and based on the defined set of requirements.

By way of a second non-limiting example, a portion of the machine control system (e.g., an ECU) may receive a message from a machine interfacing device 110 that requests to write a piece of data to a memory associated with the ECU. Typically, this piece of data corresponds to a modification to a set of parameters already stored in the associated memory. In some aspects, in response to the received request message, the ECU can determine that the piece of data requested to be written to the associated memory exceeds the threshold size or otherwise cannot be communicated as a "smaller" message. In some other aspects, the request may define the size of the piece of data (e.g., number of bytes) to be written to the memory. In either regard, the ECU can determine that the piece of data must be received as, or is in fact, a "larger" (e.g., multi-portion, multi-part, threshold size exceeding) message, and responsively generate and broadcast a flow control message that defines a set of requirements to which the message must be broadcast by the machine interfacing device 110 and/or received by the ECU. In the receiving context, in accordance with various embodiments, the flow control message can include any of: a portion identifier that identifies the message as the flow control message, a defined number of message portions that may be sent before a new flow control message is required, a duration/time period which specifies the minimum delay between each portion of the message to be received (e.g., from machine interfacing device 110) by the ECU after the broadcasted flow control message, a duration/time period in which each portion of the message must be received (e.g., from machine interfacing device 110) by the ECU after each broadcasted portion of the message, or a duration/time period in which any each portion of the message must be broadcasted by machine interfacing device 110, and/or received by the ECU, apart from one another, among other things.

As generally described herein above, the set of requirements defined in a flow control message, whether for purposes of reading or writing to a memory of an ECU, is a primary reason as to why conventional technologies cannot facilitate wireless communications with machine control systems and must rely on hardwired configurations. Among other things, the latency associated with wireless communications does not facilitate the necessary reactivity to provide consistent and reliable communications that are in compliance with the set of requirements that are naturally set forth by the network bus, the ECUs, or defined in accordance with predefined communications standards or protocols, for example.

Figure 2:
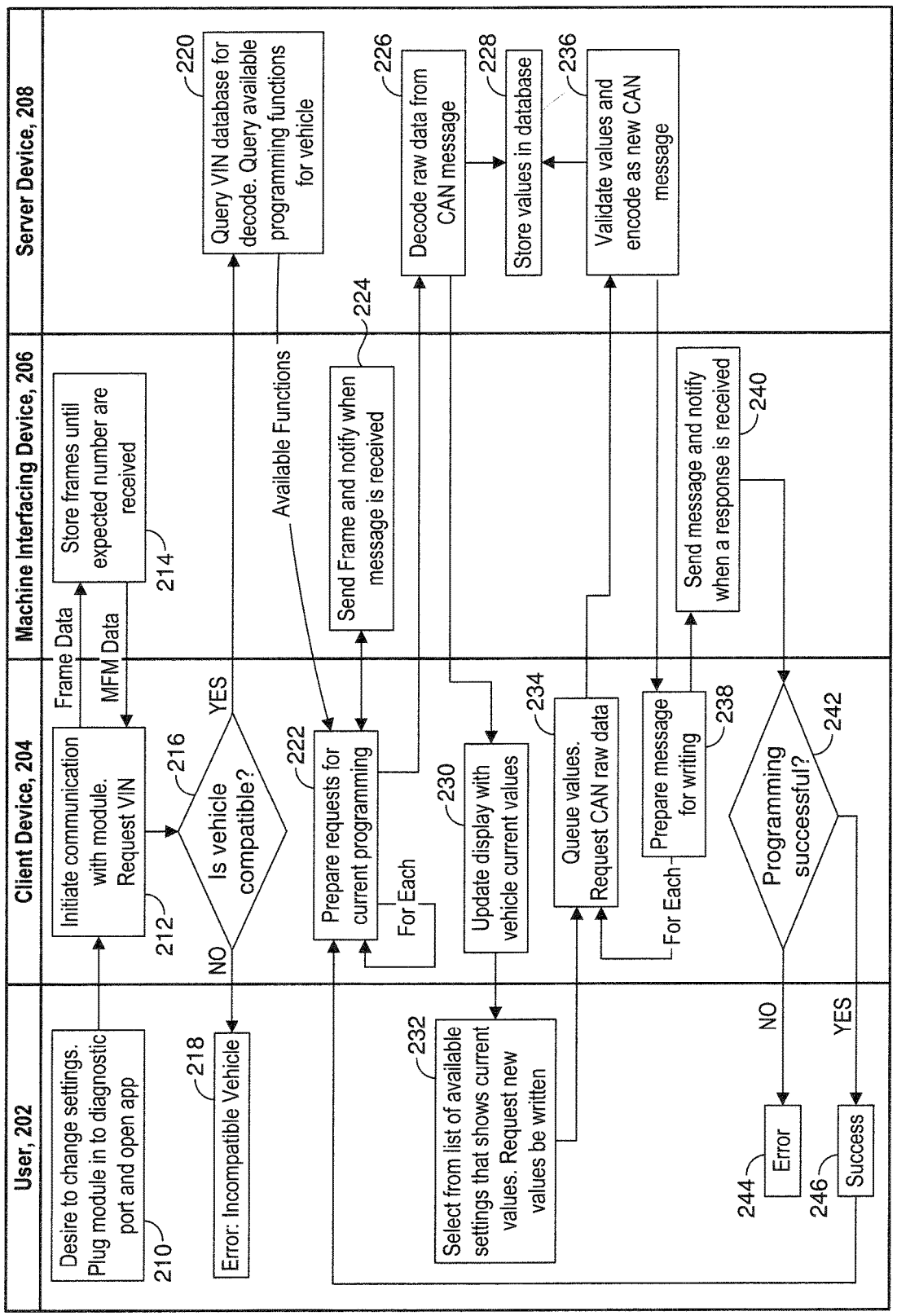
FIG. 2 is a flow diagram showing an exemplary process flow for wirelessly programming a machine or machine control system in accordance with some embodiments of the present invention.

Looking now to FIG. 2, a flow diagram 200 is provided showing an exemplary process flow for wirelessly programming a machine, in accordance with some embodiments of the present invention. The flow diagram 200 depicts columns that each represents an action or operation performed by either a user 202 associated with a client device 204 (e.g., client device 120 of FIG. 1), the client device 204 associated with the user 202, a machine interfacing device 206 (e.g., machine interfacing device 110 of FIG. 1), and a server device 208 (e.g., server device 130 of FIG. 1). In various embodiments, it is contemplated that an action performed by the user 202 can be provided as an input to the client device 204, whether through touch input, speech input, or any other input mechanism. It is also contemplated that one or more inputs to the client device 204 can be automated based on electronic processes performed by the client device 204, machine interfacing device 206, or server device 208, including but not limited to, input(s) generated based on historical data, contextual data, machine learning, natural language processing, and the like.

It should be understood that the exemplary process flow described here is not intended to be limiting, and that any one or more separate portions of the process flow can be uniquely separated from other portions in accordance with various embodiments described herein. The depicted process flow is provided merely as an exemplary process flow for wirelessly programming one or more portions of a machine, such as non-limiting examples 115A-F of FIG. 1, or in other words the control system thereof. It is further noted that references to a message, a message portion, flow control message, or a frame described herein corresponds to a piece of electronic data, such as an electronic data object or an electronic dataset.

At step 210, the user 202 can plug a module (i.e., machine interfacing device 206) into a diagnostic port of a machine, whereby the diagnostic port is coupled to a network bus that interconnects various portions of a control system (e.g., one or more ECUs) of the machine. The user 202 can further provide an input to the client device 204 to initialize an application that can facilitate wireless communications between the client device 204 and the machine interfacing device 206.

The client device 204, at step 212, can initiate a communications session with the machine interfacing device 206 based on an input provided by the user 202. In various embodiments, the communications session between client device 204 and machine interfacing device 206 can be facilitated utilizing peer-to-peer (e.g., Bluetooth, LoRa, IR, RF, ZigBee, direct Wi-Fi) technology or facilitated through a routed network (e.g., LAN, WAN, Wi-Fi, or other telecommunications network). In some aspects, the client device 204 can initiate a pairing operation, which generates and provides for display a prompt for user 202 to input a unique pairing code associated with the machine interfacing device, and establish a secure wireless communication session with the machine interfacing device 206 based on the unique pairing code. The client device 204, based on a wireless communication session with machine interfacing device 206 being established, can generate a request message for retrieving a unique identifier associated with the machine (e.g., a machine or vehicle identification number (VIN)). The client device 204 can then wirelessly send the generated request message to the machine interfacing device 206.

At step 214, the machine interfacing device 206 can wirelessly receive the request message from the client device 204 and store the request message into a memory or memory buffer. Once the machine interfacing device 206 determines that the request message is received (e.g., no more data packets are being communicated via the session, or a generated notification is received from client device 204 indicating a completed communication of the request message), the machine interfacing device 206 can automatically communicate (e.g., broadcast) the received request message to the control system of the machine via the network bus. In some aspects, as will be described, the machine interfacing device 206 can reformat or modify the request message in accordance with a format or specification of the network bus and/or machine control system. The control system of the machine, or in other words one or more ECUs thereof, can receive the request message and, in response to the request message being received thereby, generate a message that corresponds to the unique identifier associated with the machine. It is contemplated that the control system of the machine includes one or more memories, any of which may be associated with one or more of the ECUs thereof, that can store one or more corresponding parameters (e.g., unique identifiers, settings, variables) associated with one or more respective ECUs of the control system and/or the associated machine. It is further contemplated that based on characteristics of the message (e.g., the request message) communicated to the control system, a corresponding one or more ECUs can responsively generate and broadcast the message in response to the broadcasted request message. In some aspects, the ECU responsible for generating the corresponding message including the machine's unique identifier is a multi-functional module (MFM) associated with the machine.

The machine interfacing device 206 can receive, via the network bus, the response message broadcast by a portion of the machine control system (e.g., the MFM) and store the received response message into a memory and/or memory buffer of the machine interfacing device 206. In some aspects, the response message including the machine unique identifier can be a "smaller" message or a "larger" message. In the event a "larger" message is generated, the machine control system or portion thereof can broadcast a first portion of the message, whereby the first frame includes a defined set of requirements, among other things. In some embodiments, the machine interfacing device 206 can receive the first portion, parse and interpret the set of requirements, and generate and broadcast an acknowledgement message (e.g., a flow control message) in accordance with the set of requirements, independent from the client device 204. The machine control system can receive the broadcast acknowledgement message and responsively broadcast each subsequent portion of the message if, or based on a determination that, the broadcast acknowledgement message is received in accordance with the defined set of requirements. In some aspects, the received first portion can define a number of bytes that will be included in the message. In this way, the machine interfacing device 206 can determine that the message is received in its entirety once the number of bytes defined in the received first portion of the message has been met. Based on determining that the entire message has been received, the machine interfacing device 206 can wirelessly send the received message (i.e., the MFM data) to the client device 204 for storage in a memory or cache thereof. In some aspects, the machine interfacing device 206 can reformat or modify the received message into a format that is interpretable by the client device 204.

At step 216, the client device 204 can determine, based on the unique identifier included in the received message, whether the machine (e.g., vehicle) is compatible with the client device 204 and/or machine interfacing device 206. In some embodiments, compatibility can be determined by comparing the received message (or the machine unique identifier included therein) to defined compatible profiles (e.g., unique identifier formats or numbers) stored in the memory of the client device 204. In some other embodiments, compatibility can be determined by querying a third-party database, such as a website or server associated with a registration authority (e.g., Department of Motor Vehicles, National Highway Traffic Safety Administration) or the like, to retrieve a make or model of the machine based on searching the database for the machine unique identifier. In some other embodiments, a server device, such as server device 208, can determine the compatibility by searching for the machine unique identifier within defined compatible profiles stored locally by or accessible to the server device, accessing a local or remote server or database having unique identifiers mapped to corresponding makes or models, searching for the corresponding make or model in a locally or remotely accessible database of known compatible machines, or any combination thereof.

In the event the client device 204 determines that the vehicle is not compatible, or that no profiles associated with the machine (e.g., make and model, or unique identifier) are available, the client device, at step 218, can provide for display a graphical user interface (GUI) notification that the machine is not compatible with the client device 204 and/or machine interfacing device 206. Alternatively, at step 220, the client device 204 can determine that the machine is compatible. As such, the client device 204 can generate a signal that can include the machine unique identifier for communication to the server device 208. The server device 220 can receive the signal, generate a query based on the signal (e.g., including the machine unique identifier), search a database to determine a make and/or model of the machine based on the machine unique identifier, determine that the same or a different database includes a set of programming functions compatible with the make and/or model of the machine, and/or select the determined compatible set of programming functions for communication back to the client device 204, among other things.

At step 222, the client device 204 can receive the compatible set of programming functions from the server device 208 and store them into a memory or cache. In some embodiments, each programming function can correspond to a piece of code or a programing operation for updating or modifying a piece of data stored by a particular portion (e.g., ECU) of the machine control system. In some embodiments, the client device 204 can generate a set of request messages based on the received compatible set of programming functions, each generated request message corresponding to at least a portion of the received compatible set of programming functions. In other words, the client device 204 can generate a request message to retrieve, from the machine control system, each piece of data that is capable of either being retrieved or updated via the machine interfacing device 206. Due to the nature of the communication protocol or specification, it is contemplated that the piece of data can be communicated as "smaller" and/or "larger" messages.

At step 222-224, the client device 204 can, for each generated request message, wirelessly communicate the generated request message to the machine interfacing device 206. In this way, the machine interfacing device 206 can responsively communicate the request message to the machine control system via the network bus, and receive a response message based on the communicated request message. In various embodiments, the machine interfacing device 206 can independently request, receive, and store both "smaller" and "larger" response messages, regardless of type. In other words, regardless of whether the machine control system requires a "smaller" or "larger" message to be broadcast to communicate a requested piece of data to the machine interfacing device 206, various aspects of managing the communication (e.g., generating and broadcasting acknowledgement messages, receiving messages or message portions in separate parts or in accordance with the defined set of requirements) can be independently handled and stored by the machine interfacing device 206. For each request message communicated to the machine control system via machine interfacing device 206, a corresponding response message, whether a message or message portion, can be received by the machine interfacing device 206 and communicated back to the client device 204 for storage.

In some embodiments, the client device 204 can communicate the received response messages (i.e., the requested pieces of data) to the server device 208. In some embodiments, the server device 208 can store, at step 228, the communicated response messages to a database or other memory. The response messages can be stored in association with a profile, and may include a timestamp or other reference identifier. In some aspects, the profile can be associated with a user account or device identifier associated with the client device 204. In this way, the received response messages can be representative of a current state (e.g., current parameter settings or currently stored pieces of data) of the machine control system.

At step 230, the client device 204 can provide for display the current pieces of data (i.e., parameter settings) associated with the machine control system, or at least those that are retrievable and/or modifiable based on the compatible set of programming functions. As noted above, the current pieces of data are received from the machine control system as "smaller" and/or "larger" response messages, whereby the requirements of communications for receiving the messages are accordingly managed by the machine interfacing device 206. The client device 204 can, at step 232, provide for display a GUI that facilitates the modification of any one or more of the displayed current pieces of data (i.e., parameter settings). By way of example, the GUI can include an interface that enables a user to delete parameter settings, type in new or modified parameter settings, modify parameter settings utilizing arrows or ± signs, or even touch and drag GUI elements corresponding to adjustable parameter settings, among other things. The GUI can further include a GUI element or other input mechanism that enables a user 202 to initiate the generation of a request to write the new or modified pieces of data (i.e., parameter settings) to corresponding portions (i.e., ECUs or associated memories) of the machine control system.

At step 234, the client device 204 can receive an input corresponding to a request to write the new or modified pieces of data to the machine control system. In response, the client device 204 can queue the modified or updated pieces of data (e.g., values, parameters) for writing to the machine control system.

In some embodiments, the client device 204 can communicate the modified or updated pieces of data to the server device 208. In this way, the server device 208 can, at step 236, determine that the modified or updated pieces of data are valid (e.g., that the parameter(s) are within a defined, compatible, or safe range of parameter values). The server device 208 can further store the modified or updated pieces of data into the database. In some embodiments, the modified or updated pieces of data can be stored in association with the profile, and may include a timestamp to indicate when certain pieces of data were received and/or modified.

In some embodiments, the server device 208 can communicate pieces of data associated with a profile to a client device 204 also associated with the profile. In some aspects, the pieces of data can be historically stored pieces of data, such as previously communicated, modified and/or updated pieces of data. In this regard, the client device 204 can receive pieces of data, which can be provided for display by the client device 204. In some aspects, the client device 204 can receive an input that indicates an approval of the displayed pieces of data. In various embodiments, the client device 204 can communicate the received pieces of data to the machine interfacing device 206, whether based on a received input indicating approval, automatically, or in response to any other defined and satisfied condition. In this regard, in some embodiments, the machine interfacing device 206 can receive the pieces of data from the client device 204, and encode (e.g., add byte counts, multi-portion identifiers, and/or other attributes) the modified or updated pieces of data into programming messages that are formatted in accordance with the predefined communications standard or protocol. In other words, the machine interfacing device 206 can generate a programming message based on the received pieces of data, format them as a "smaller" or "larger" (e.g., multi-portion) message, and include the necessary characteristics (e.g., sequential ordering, portion identifiers, first message portion (if applicable)) to facilitate the storing of the modified or updated pieces of data to the machine control system.

In some other embodiments, the server device 208 can encode (e.g., add byte counts, multi-portion identifiers, and/or other attributes) the modified or updated pieces of data into programming messages that are formatted in accordance with the predefined communications standard or protocol. In other words, the server device 208 can generate a programming message that may be formatted as a "smaller" or "larger" (e.g., multi-portion) message, including the necessary characteristics (e.g., sequential ordering, portion identifiers, first message portion (if applicable)) to facilitate the storing of the modified or updated pieces of data to the machine control system. The server device 208 can communicate the generated programming message back to the client device 204, so that the client device 204 can, at step 238, prepare each generated programming message for writing via the machine interfacing device 206.

In some other embodiments, the client device 204 can independently determine that the modified or updated pieces of data are valid (e.g., that the parameter are within a defined, compatible, or safe range of parameter values). The client device 204 can further store the modified or updated pieces of data into a memory. In some embodiments, the modified or updated pieces of data can be stored, and may include a timestamp to indicate when certain pieces of data were modified. The client device 204 can, in some embodiments, then encode the modified or updated pieces of data into programming messages that are formatted in accordance with the predefined communications standard or protocol. In other words, in some embodiments, the client device 204 can generate a programming message that may be formatted as a "smaller" or "larger" (e.g., multi-portion) message, including the necessary characteristics (e.g., sequential ordering, portion identifiers, first message portion (if applicable)) to facilitate the storing of the modified or updated pieces of data to the machine control system. The client device 204 can prepare each generated programming message for writing. The client device 204 can wirelessly communicate each generated programming message to the machine interfacing device 206 via the communication session established therewith. The machine interfacing device 206 can receive a generated programming message, store the received programming message into a memory or memory buffer thereof, and manage the communications of the stored programming message to the machine control system via the network bus to which the machine interfacing device 206 is coupled.

In accordance with various embodiments, the machine interfacing device 206 can independently determine whether a programming message is a "smaller" message or "larger" message, and independently manage the formatting, parsing (e.g., into portions), modifying (e.g., adding portion identifiers or other attributes), and subsequent flow of messages or message portions from or to the machine control system. In some embodiments, the machine interfacing device 206 can select which portion of a message needs to be communicated based on associated characteristics (e.g., portion identifier), so that the message is properly communicated to the machine control system. The machine interfacing device 206 can also independently generate responses to flow control messages, and adjust timing mechanisms so that responses to flow control messages or timing of subsequent portions of a message are communicated in accordance with the set of requirements included in received flow control messages.

In some embodiments, as the machine interfacing device 206 communicates each portion of a programming message to the machine control system via the network bus, the communicated portion can be removed or deleted from the memory or memory buffer. In this way, by determining that the memory or memory buffer is empty, the machine interfacing device 206 can determine that the programming message was successfully delivered. In some other embodiments, the machine interfacing device 206 can simply monitor and determine that each portion of the programming message was communicated to the machine control system via the network bus. In this way, by comparing a known number of portion in the programming message to a number of portion communicated, the machine interfacing device 206 can determine that the programming message was successfully delivered. In some other embodiments, the machine interfacing device 206 can receive a completion message from the machine control system that is indicative of a successful delivery of the programming message, or all portions thereof. In this way, by receipt of the completion message, the machine interfacing device 206 can determine that the programming message was successfully delivered. In some instances, an error can occur during the delivery process. The error can be detected based on the machine interfacing device 206 determining that a timeout has occurred, being unable to communicate one or more portions of the programming message to the machine control system, or receiving an error message from the machine control system, among other things. At step 240, the machine interfacing device 206 can generate a notification based on either a determination of a successful delivery or a detected error, and communicate the generated notification to the client device 204 for responsive display thereby.

The client device 204, at step 242, can receive the communicated notification and provide one or more corresponding GUI elements for display to a display coupled thereto. The GUI elements can include the notification or any portion thereof, or can include other elements that clearly depict whether the notification was generated based on a successful delivery of the programming message or a detected error. In some embodiments, if an error is detected, at step 244, the user is made aware of the error based on the displayed notification. In some other embodiments, if the delivery is successful, at step 246, the user is made aware of the successful delivery based on the displayed notification, and the client device 204 can refresh the GUI. The GUI can be refreshed by once again querying the machine control system for current pieces of data, as described in step 222.

The foregoing process flow is merely provided as an exemplary process flow, and is not intended to be limiting in any way. It is contemplated that certain portions of the process flow can be removed, skipped over, performed in unison, performed in different orders, or performed by other components of the system described herein. It is also contemplated that additional steps can also be included within the process flow, while remaining within the purview of the present disclosure.

Looking now to FIG. 3, a block diagram 300 is provided illustrating an exemplary machine interfacing device 310 for wirelessly programming a machine or control system thereof, such as one of machines 115*a-d*, in accordance with various embodiments described herein. In various embodiments, the machine interfacing device 310 can comprise one or more computing devices, such as computing device 800 of FIG. 8, one or more hardware devices or components, and/or any number of networking components, operating in a local or distributed environment to facilitate the operations described herein.

Depicted in the block diagram 300 is a machine interfacing device 310 that can include, among other things, a wireless communications component 320, a message buffering component 330, and a payload transferring component 340. As each of the described components are depicted as being included in the machine interfacing device 310, it is contemplated that any component depicted therein is not limited to the illustrated embodiment, and can be distributed amongst a plurality of components, modules, or devices, or in some instances, may be conflated into a single component, module, or device, such as a processor or other hardware component, module, or device. It is also contemplated that any one or more of the described components can be completely removed from the system, so long as one or more operations described in correspondence to a removed component can be compensated for by one or more other components, external resource, remote computing device, coupled component, coupled module, or coupled hardware device, among other things. In some embodiments, the machine interfacing device 310 can include a power module (not shown) that can supply power to the various components of the machine interfacing device 310. In some embodiments, the power module can be coupled to a battery, which can be removably inserted into the machine interfacing device 310. In some other embodiments, the power module can be coupled to a set of pins of a plurality of pins (e.g., as depicted on machine interfacing device 110 of FIG. 1) that can plug into or physically interface with a port (e.g., a diagnostics port) of a machine (e.g., any of machines 115*a-d*) and receive power from a battery (not shown) of the machine.

The machine interfacing device 310, similarly described as machine interfacing device 110 of FIG. 1 or machine interfacing device 206 of FIG. 2, can include a wireless communications component 320. The wireless communications component 320 can include, among other things, a Bluetooth transceiver, a LoRa transceiver, a Wi-Fi transceiver, an infrared (IR) transceiver, a NFC transceiver, a ZigBee transceiver, or any other wireless communications transceiver that facilitates wireless communications between the machine interfacing device 310 and another computing device having a like or compatible wireless communications component. In various embodiments, the wireless communications component 320 can also establish wireless communications sessions with another computing device via near-field communications (NFC), personal area networks (PANs), local area networks (LANs), wide area networks (WANs), or the like, so long as the other computing device is utilizing a corresponding or compatible transceiver. In various embodiments, the wireless communications component 320 can include a set of transceivers to facilitate different types of wireless communications with one or more other computing devices.

The machine interfacing device 310 can further include a message buffering component 330 that can either be implemented as software, firmware, and/or hardware. In some embodiments, the message buffering component 330 can be coupled to at least a portion of a memory (not shown) and/or a processor (not shown) of the machine interfacing device 310. In some embodiments, the portion of the memory can be a cache or memory buffer, which can facilitate quick read and/or write access to one or more temporary and/or persistent electronic memory locations of the memory and/or processor. In various embodiments, the message buffering component 330 can receive, store, and/or access data (e.g., messages, message portions, flow control messages, other datasets) received from another computing device (e.g., client device 120 of FIG. 1) via the wireless communications component 320 and/or received from a control system of a machine via the machine's network bus. In various embodiments, the message buffering component 330 can include programmed or embedded logic that facilitates, among other things, determining that a memory buffer or cache includes stored data or is empty, or determining a number of discrete data pieces (e.g., message portions) stored in the memory buffer or cache.

The machine interfacing device 310 can also include a payload transferring component 340 that can manage the communication of data stored in the memory buffer or cache to one of another computing device, such as client device 120 of FIG. 1 via wireless communications component 320, or a control system of a machine via the network bus to which the machine interfacing device 310 is physically coupled to (e.g., via a diagnostics port of the machine). In various embodiments, the payload transferring component 340 can be responsible for facilitating the transfer of data between the client device and the machine control system, and can determine that the data stored in the memory or cache by message buffering component 330 was communicated from the machine control system or the other computing device. In this regard, the payload transferring component 340 can, based on where the data was communicated from, determine that the stored data is intended for communication from a sending device (e.g., client device, machine control system) to a receiving device (e.g., machine control system, client device), respectively. In some aspects, data communicated from a particular device can be stored in a corresponding portion of the memory or cache.

In some embodiments, the payload transferring component 340 can determine that data (e.g., message, message portion, flow control message, other dataset) is being received from a machine control system via the network bus. This determination can be made based on a passive receiving of data via the port to which the machine interfacing device 310 is coupled. In some other embodiments, the payload transferring component 340 can anticipate and/or actively receive data via the port to which the machine interfacing device 310 is coupled. By way of non-limiting example, the machine interfacing device 310 can wirelessly receive a message or message portion from the other client device, and the client device can send a signal to the machine interfacing device 310 indicating either a size (e.g., amount of data, number of portions) of the message or message portion, or that the message or message portion is completely communicated thereto. The machine interfacing device 310 can determine based on the signal that the message or message portion is completely received (e.g., based on expected size reached or indication of completion), and responsively send the message or message portion to the machine control system via the network bus while actively listening for response messages to be received from the machine control system.

Similarly, the payload transferring component 340 can determine that data (e.g., message, message portion, flow control message, other dataset) is being received from another computing device, such as client device 120 of FIG. 1. This determination can be made based on a passive receiving of data via the wireless communications component 320. In some other embodiments, the payload transferring component 340 can anticipate and/or actively receive data via an established communications session with the other computing device via the wireless communications component 320. By way of non-limiting example, the machine interfacing device 310 can receive a message (e.g., message or message portion) from the machine control system, and the machine control system send a signal to the machine interfacing device 310 indicating either a size (e.g., amount of data, number of frames) of the message or that the message is completely communicated thereto. The machine interfacing device 310 can determine based on the signal that the message is completely received (e.g., based on expected size or indication of completion), and responsively send the message to the other client device while actively listening for response messages to be received from the other client device.

As described herein, the payload transferring component 340 of machine interfacing device 310 can independently determine whether a message (e.g., programming message, response message, or portions thereof) being received and/or to be communicated is a "smaller" message, "larger" message, or portion of a "larger" message. In some aspects, the determination can be made based on information included in a received message or message portion that indicates whether the message is a "smaller" message or "larger" message. In some other aspects, the determination can be made based on a determination that a received message is equal to, larger than, and/or exceeds a threshold size (e.g., one defined by a protocol or specification of the network bus or machine control system). In various embodiments, the threshold size can be determined by the machine interfacing device 310, or programmatically defined and stored in a memory of the machine interfacing device 310. In this regard, the payload transferring component 340 can modify a received "larger" message and, in some embodiments, generate a set of message portions therefrom, where each portion is sized less than or equal to the threshold size. In some further embodiments, the payload transferring component 340 can further modify each message portion from the generated set of message portions to include relevant attributes, such as portion identifiers, communication requirements, or number of portions in the message, among other things. In some other aspects, the received message can be a first message portion that indicates that the message to be received is a "larger" or multi-portion message. In various embodiments, the payload transferring component 340 can independently manage the flow of messages or message portions from or to the machine control system, irrespective of the size, by converting messages into message portions to comply with requirements of the machine control system, if necessary.

In some embodiments, the machine interfacing device 310 can select which portion of a message needs to be communicated based on associated characteristics (e.g., portion identifier), so that the message is properly communicated to the machine control system. More specifically, a first portion of a programming message may include a request to write the programming message to a memory of the machine control system. In some aspects, the payload transferring component 340 can inject a portion identifier, among other attributes described herein, into a generated first portion of the programming message (e.g., if the programming message exceeds the threshold size). The machine control system can responsively generate and broadcast a flow control message that is received by the payload transferring component 340. The payload transferring component 340 can receive the flow control message broadcast by the machine control system as a response to the broadcast request, parse and/or process the flow control message, and adjust characteristics (e.g., speed, interval, timing, order) of communicating the subsequent message portions of the programming message to the machine control system via the network bus. In this way, the payload transferring component 340 can actively adjust the communication characteristics so that messages or message portions are properly communicated to the machine control system in accordance with a set of requirements defined in a flow control message. In some aspects, the payload transferring component 340 can generate each subsequent portion of the message (e.g., portions after the first generated portion, each sized less than or equal to the threshold size), so that the subsequent portions can be communicated as required by the payload transferring component 340 in accordance with the flow control message or communication requirements of the machine control system.

In some embodiments, the payload transferring component 340 can delete or remove, or instruct the message buffering component 330 to delete or remove, each message or message portion from the memory buffer or cache based on a communication of the message or message portion to the machine control system. In some other embodiments, the machine control system can send an acknowledged receipt of a communicated message or message portion by broadcasting a confirmation message or other signal. In this regard, the payload transferring component 340 can determine that the message or message portion has been successfully communicated to the machine control system based on a determination that the memory buffer or cache is empty, an expected number of message portions has been communicated to the machine control system, or a confirmation message or other signal being received from the machine control system.

In some embodiments, the payload transferring component 340 can include a standards formatting component 350 and a network bus controller component 360. The standards formatting component 350 can define, for the payload transferring component 340, a set of rules that facilitate the control or regulation of communications to and from a machine control system. In other words, the set of rules can be defined programmatically. In some embodiments, the set of rules can be received as an electronic dataset from any one of the client device (e.g., client device 120 of FIG. 1), server device (e.g., server device 130 of FIG. 1), or can be selected from one of a plurality of defined rulesets stored in a memory of the machine interfacing device 310. It is contemplated that a particular ruleset can be selected by the machine interfacing device 310 based on a type of machine control system with which the machine interfacing device 310 is communicating. In some aspects, the type can be determined by the machine interfacing device 310, for example, based on a machine unique identifier associated with the machine control system, as will be described. In some embodiments, the set of rules can correspond to requirements set forth by a predefined communications standard or protocol associated with the machine control system, such as the ISO 15765-2 CAN communications standard, by way of non-limiting example.

In some embodiments, the standards formatting component 350 can receive a piece of data (e.g., a "larger" message) from a remote computing device, such as client computing device 120 of FIG. 1, and modify the piece of data into one or more message portions that comply with the defined set of rules. In some aspects, the standards formatting component 350 can generate a programming message based on the piece of data received from the remote computing device. In some embodiments, the standards formatting component 350 can generate a programming message formatted as a set of "smaller" messages (e.g., a multi-portion message), and having the necessary characteristics (e.g., sequential ordering, portion identifiers, first message portion (if applicable)) to facilitate the storing of the modified or updated pieces of data to the machine control system.

In some other embodiments, the standards formatting component 350 can perform the communications management functions for the payload transferring component 340. More specifically, the standards formatting component 350 can index a received programming message into a specified order based on associated portion identifiers, select and provide the payload transferring component 340 with each portion of a message (e.g., a "larger" message) for communication to a machine control system, and/or regulate when the payload transferring component 340 can communicate each message portion for communication to the machine control system, among other things. In some embodiments, the standards formatting component 350 can check a message, received from the remote client device, to ensure that the message is in compliance with the predefined communications standard or protocol based on a comparison of the received message to the set of rules defined thereby. In some embodiments, the standards formatting component 350 can receive a different set of rules (e.g., from a remote client device) so that the payload transferring component 340 can be compatible with various machine control systems utilizing different predefined communications standards or protocols.

The network bus controller component 360, on the other hand, can convert a message or each portion thereof into signals that are compatible with the network bus of the machine control system. For instance, the message or message portions received from a remote computing device, such as client device 120 of FIG. 1, can be received in a digital format. As communications sent or received via the network bus of the machine control system may require that messages or message portions be communicated utilizing an alternative format specific to the machine or network bus thereof, the network bus controller component 360 can convert a message or portions thereof from the digital format to the alternative format, or from the alternative format to the digital format (e.g., if received from the machine control system via the network bus). In this way, the network bus controller component 360 can facilitate the conversion of messages or message portions that can be communicated between a remote computing device and a machine control system via the network bus. In various embodiments, the alternative format can include analog signals, wave patterns, hex code, or any other signal pattern or data format through which electronic data (e.g., messages or message portions) can be transmitted or received. In some further embodiments, the digital format can include digital signals, binary code, or any other signal pattern or data format through which electronic data can be wirelessly transmitted or received. In various embodiments, messages or portions thereof received in a first format from a remote computing device can be converted into a second format by the network bus controller component 360 and broadcast to the network bus of the machine control system (e.g., via a diagnostics port). Similarly, messages or portions thereof generated in a second format and broadcast to the network bus of the machine control system by one or more ECUs thereof can be received by the network bus controller component 360, converted into the first format, and stored into a memory buffer or cache of the machine interfacing device 310 for subsequent communication to the remote computing device in the first format.

Looking now to FIG. 4, a block diagram 400 is provided illustrating an exemplary client device 410 for wirelessly programming a machine or control system thereof, such as one of machines 115a-d, in accordance with various embodiments described herein. In various embodiments, the client device 410 can comprise one or more computing devices, such as computing device 800 of FIG. 8, one or more hardware devices or components, and/or any number of networking components, operating in a local or distributed environment to facilitate the operations described herein. While not shown, it is contemplated that client device 410 includes a wireless communications component, such as wireless communications component 320 of FIG. 3, or a similar component. In some embodiments, the client device 410 can include a telecommunications device, such as a mobile phone.

Depicted in the block diagram 400 is a client device 410 that can include, among other things, an initializing component 420, a function retrieving component 430, a parameter querying component, a parameter input component 450, a raw data retrieving component 460, and a presentation component 470. As each of the described components are depicted as being included in the client device 410, it is contemplated that any component depicted therein is not limited to the illustrated embodiment, and can be distributed amongst a plurality of components, modules, or devices, or in some instances, may be conflated into a single component, module, or device, such as a processor or other hardware component, module, or device. It is also contemplated that any one or more of the described components can be completely removed from the system, so long as one or more operations described in correspondence to a removed component can be compensated for by one or more other components, external resource, remote computing device, coupled component, coupled module, or coupled hardware device, among other things.

The client device 410, similarly described as client device 120 of FIG. 1 or client device 204 of FIG. 2, can include an initializing component 420 that establishes a wireless communications session to a machine interfacing device, such as machine interfacing device 310 of FIG. 3. The initializing component 420 can activate, among other things, a Bluetooth transceiver, a LoRa transceiver, a Wi-Fi transceiver, an infrared (IR) transceiver, a NFC transceiver, a ZigBee transceiver, or any other communications transceiver that facilitates wireless communications between the client device 410 and a machine interfacing device having a like or compatible wireless communications component. In some aspects, the initializing component 420 can receive an input that causes the client device 410 to initiate a pairing session. The pairing session can require that a pairing code associated with the machine interfacing device be provided as input to the client device 410 so that a secure communication session be established therewith. In various embodiments, inputs to the client device 410 can be received as one of touch inputs, button or key inputs, speech inputs, remote terminal inputs, or any other form of input to which data can be conveyed from a user to a computing device, such as computing device 800 of FIG. 8.

Once the wireless communications session to the machine interfacing device is established, the client device 410 can activate a function retrieving component 430. The function retrieving component 430 can perform one or more functions, such as determining a unique identifier associated with the machine or control system thereof, determining whether the machine or control system thereof is compatible with the client device 410 or machine interfacing device based on the determined unique identifier, or obtaining a set of programming functions that are determined to correspond to the determined unique identifier.

The function retrieving component 430 can determine a unique identifier associated with the machine or control system thereof, by generating a request message for retrieving a unique identifier associated with the machine (e.g., a machine or vehicle identification number (VIN)). The client device 410 can wirelessly send the generated request message to the machine interfacing device via the established wireless communications session. In various embodiments, the request message can include a "smaller" or "larger" message. After the machine interfacing device retrieves the unique identifier from the machine, the client device 410 can wirelessly receive the unique identifier from the machine interfacing device. In various embodiments, the unique identifier can be received in the form of, or included in, a "smaller" or "larger" message.

In some embodiments, the function retrieving component 430 can determine compatibility with the machine by comparing the received message (or the machine unique identifier included therein) to defined compatible profiles (e.g., unique identifier formats or numbers) stored in a memory (not shown). In some other embodiments, compatibility can be determined by generating a query based on the received message and searching a third-party database, such as a website or server associated with a registration authority (e.g., Department of Motor Vehicles) or the like, to retrieve a make or model of the machine based on searching the database with the machine's unique identifier. In some other embodiments, the function retrieving component 430 can generate a query and send the query to a server device, such as server device 130 of FIG. 1 or 208 of FIG. 2, configured to search for the machine unique identifier (or determined make or model). In various embodiments, the server device can employ the query to search in defined compatible profiles stored in a memory local to or accessible to the server device. In some other embodiments, the server device can access a local or remote server or database having unique identifiers mapped to corresponding makes or models. In some further embodiments, the server device can search for the determined make or model in a locally or remotely accessible database of known compatible machines. In this regard, the server device can communicate, to the function retrieving component 430, a set of programming functions that are compatible with the machine based on the determined unique identifier associated with the machine to which the machine interfacing device is connected. In some embodiments, the function retrieving component 430 can store the received set of programming functions into a memory.

In some embodiments, the function retrieving component 430 can determine that the machine is not compatible, or that no profiles are associated with the machine (e.g., make and model, or unique identifier). As such, the function retrieving component 430 can generate a notification that a presentation component 470 can be present to a display of the client device 410 as graphical user interface (GUI) notification, among other things.

In some embodiments, each programming function can correspond to a piece of code or a programing operation for updating or modifying a piece of data or dataset stored by a particular portion (e.g., ECU) of the machine control system. In some embodiments, the client device 410 can include a parameter querying component 440 that can employ the obtained programming functions to determine, for each programming function, a current state or set of parameters associated with the programming function. In other words, the client device 410 can generate a request message based on a programming function to retrieve, from at least a portion of the machine control system, a piece of data or dataset that is capable of either being retrieved or updated via the machine interfacing device. Due to the nature of the network bus, communication protocol, or specification, among other things, it is contemplated that the piece of data can be communicated as either "smaller" or "larger" (e.g., multi-portion) messages.

In some aspects, a programming function can correspond to one or more specific ECUs of the machine control system, and can be employed to read or write a piece of data respectively to or from the corresponding ECU(s)'s memory. The parameter querying component 440 can generate a request message that corresponds to one or more of the obtained programming functions, and wirelessly communicate the generated request message to the machine interfacing device. In this way, the machine interfacing device can accordingly employ the generated request message to receive a response message (e.g., a corresponding piece of data) from the corresponding ECU(s) via the network bus of the machine control system. The parameter querying component 440 can thus generate a request message for each programming function. Each request message can be generated in accordance with the predefined communications standard or protocol. The parameter querying component 440 can then wirelessly retrieve a corresponding response message including the requested piece(s) of data from the machine control system via the machine interfacing device.

In some embodiments, the parameter querying component 440 can communicate the received response messages (i.e., the requested pieces of data) to a remote server device, such as remote server device 130 of FIG. 1 or 208 of FIG. 2, for storage to a database or other memory in association with the client device 410 or an account associated with the client device 410. In some embodiments, the presentation component 470 can provide for display the retrieved pieces of data (i.e., parameter settings) associated with the machine control system, or at least those that are retrievable and/or modifiable based on the obtained set of programming functions.

The client device 410 can include a parameter input component 450 that employs the presentation component 470 to provide for display a GUI that facilitates the modification of any one or more of the retrieved current pieces of data (i.e., parameter settings). By way of example, the GUI can include an interface that enables a user to delete parameter settings, type in new or modified parameter settings, modify parameter settings utilizing arrows or ± signs, or even touch and drag GUI elements corresponding to adjustable parameter settings, among other things. The GUI can further include a GUI element or other input mechanism that the parameter input component 450 can detect activation thereof based on a received input. In various embodiments, based on the detected activation, the client device can encode the modified or updated pieces of data into corresponding programming messages, the client device can communicate the modified or updated pieces of data to the machine interfacing device for encoding, or the client device can communicate the modified or updated pieces of data to the server device for encoding. In various embodiments, based on the input, the parameter input component 450 can initiate the generation of one or more programming messages to write the received new or modified pieces of data (i.e., parameter settings) to corresponding portions (i.e., ECUs or associated memories) of the machine control system via the machine interfacing device.

In some embodiments, the parameter input component 450 can cause the generation of a programming message that may be formatted as a "smaller" or "larger" multi-portion message, including the necessary characteristics (e.g., sequential ordering, portion identifiers, first message portion (if applicable)) to facilitate the storing of the modified or updated pieces of data to the machine control system. In some embodiments, the parameter input component 450 can generate, for each of the new or modified pieces of data, a corresponding programming message based on the new or modified piece of data and the corresponding programming function. The generated programming message(s) can then be wirelessly communicated to the machine interfacing device for managed communication to the machine control system or the corresponding ECUs thereof.

In some other embodiments, the parameter input component 450 can communicate the modified or updated pieces of data to the remote server device, such as remote server device 130 of FIG. 1 or 208 of FIG. 2. In this way, the remote server device can determine that the modified or updated pieces of data are valid (e.g., that the parameter are within a defined, compatible, or safe range of parameter values). The remote server device can store the modified or updated pieces of data into a database in association with the client device 410 or associated account. In some embodiments, the remote server device can encode the modified or updated pieces of data into programming messages that are formatted in accordance with the predefined communications standard or protocol. In other words, as described in accordance with some embodiments, the server device can generate a programming message that may be formatted as a "smaller" or "larger" multi-portion message, including the necessary characteristics (e.g., sequential ordering, portion identifiers, first message portion (if applicable)) to facilitate the storing of the modified or updated pieces of data to the machine control system. The client device 410 can then receive the generated programming message(s) from the remote server device, so that the client device 410 can prepare each generated programming message for writing. It is contemplated that based on various implementations, any of the parameter input component 450, the standards formatting component 350 of FIG. 3, or the remote server device can generate the programming message for managed communication to the machine control system or the corresponding ECUs via the machine interfacing device.

In some embodiments, the client device 410 can wirelessly receive a notification from the machine interfacing device indicating that the programming message(s) have been successfully or unsuccessfully communicated to and/or received by the machine control system. In this regard, a raw data retrieving component 460 can receive the notification and employ the presentation component 470 to provide one or more corresponding GUI elements corresponding to the notification for display. The GUI elements can include the notification or any portion thereof, or can include other elements that clearly depict whether the notification was generated based on a successful delivery of the programming message(s) or a detected error. In some embodiments, if the client device 410 determines that delivery is successful based on the notification, the raw data retrieving component 460 can once again query the machine control system for current pieces of data, as described in in accordance with the parameter querying component 440. In other words, the raw data retrieving component 460 can generate a set of request messages to once again retrieve the pieces of data from the machine control system. The raw data retrieving component 460 can, upon receiving the response messages from the machine interfacing device, employ the presentation component 470 to provide for display the current parameter settings or pieces of data associated with the machine control system. In some embodiments, the client device 410 can employ the presentation component 470 to present a prompt to cycle (e.g., restart, or turn off then turn back on) the machine before the raw data retrieving component 460 generates the set of request messages. In this way, the client device 410 can verify that the pieces of data were appropriately written to the machine control system after the machine is cycled.

Figure 5:
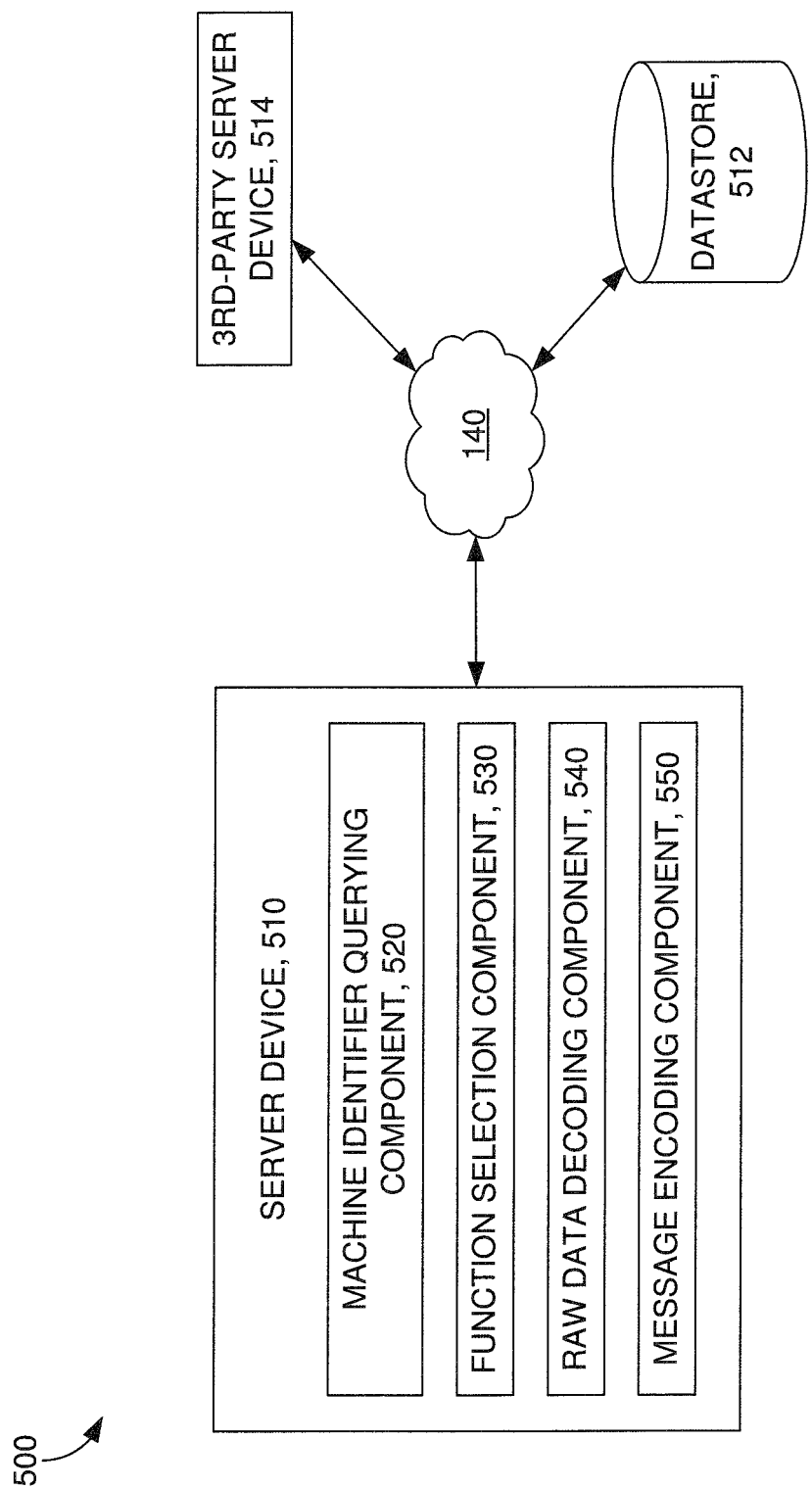
FIG. 5 is a block diagram illustrating an exemplary implementation of a server device in accordance with some embodiments of the present invention.

Looking now to FIG. 5, a block diagram 500 is provided illustrating an exemplary server device 510 for wirelessly programming a machine or control system thereof, such as one of machines 115a-d, in accordance with various embodiments described herein. In various embodiments, the server device 510 can comprise one or more computing devices, such as computing device 800 of FIG. 8, one or more hardware devices or components, and/or any number of networking components, operating in a local or distributed environment to facilitate the operations described herein. While not shown, it is contemplated that server device 510 includes a networking component that can facilitate a communications session with a client device, such as client device 410 of FIG. 4, via a network. In various embodiments, the server device 510 can establish communications sessions with a $3^{rd}$-party server device 514, which can include a registry database or other searchable data store for determining a make and/or model of a machine based on a provided unique identifier associated with the machine. The server device 510 can also be coupled to a memory, such as a data store 512, which can be accessed directly or via a network, such as network 140.

Depicted in the block diagram 500 is a server device 510 that can include, among other things, a machine identifier querying component 520, a function selection component 530, a raw data decoding component 540, and a message encoding component 550. As each of the described components are depicted as being included in the server device 510, it is contemplated that any component depicted therein is not limited to the illustrated embodiment, and can be distributed amongst a plurality of components, modules, or devices, or in some instances, may be conflated into a single component, module, or device, such as a processor or other hardware component, module, or device. It is also contemplated that any one or more of the described components can be completely removed from the system, so long as one or more operations described in correspondence to a removed component can be compensated for by one or more other components, external resource, remote computing device, coupled component, coupled module, or coupled hardware device, among other things.

The server device 510, similarly described as server device 130 of FIG. 1 or server device 208 of FIG. 2, can include a machine identifier querying component 520 that can receive a machine unique identifier, or a generated query including the machine unique identifier, from a client device, such as client device 410 of FIG. 4. The machine identifier querying component 520 can receive a machine unique identifier or a generated query including the machine unique identifier to search at least one of a $3^{rd}$-party server device 514 or a data store 512. In some embodiments, the machine identifier querying component 520 can receive and/or generate search results that indicate a make and/or model of the machine associated with the received machine unique identifier.

In some embodiments, the server device 510 can include a function selection component 530 that can search the data store 512 to determine that a set of programming functions associated with the determined make and/or model of the machine, or the machine unique identifier, is stored therein. The function selection component 530 can select the determined associated set of programming functions as being determined compatible with the machine, and communicated the selected set of programming functions to the client device via the network.

In some embodiments, the server device 510 can include a raw data decoding component 540. The raw data decoding component 540 can receive one or more messages from the client device via the network. In some aspects, the received message(s) can include "smaller" or "larger" multi-portion messages communicated to the client device from the machine control system via a machine interfacing device, such as machine interfacing device 310 of FIG. 3. In some embodiments, the raw data decoding component 540 can parse, extract, and/or format electronic information (e.g., parameters, settings) from the received message(s) for storage to data store 512. In some aspects, the raw data decoding component 540 can save the electronic information to data store 512 in association with an account or identifier associated with the client device from which a message was received. In various embodiments, the account or identifier associated with the client device can be determined based on the associated account or identifier being communicated with the message(s), or being associated with the communications session established between the server device 510 and the client device.

In some embodiments, the server device 510 can include a message encoding component 550. The message encoding component 550 can receive electronic information, whether retrieved from the data store 512 or received from the client device, and encode a message (e.g., a "smaller" or "larger" multi-portion message) that is compatible with the network bus, or in other words, formatted in accordance with the predefined communications standard or protocol associated with the machine control system and/or machine interfacing device. In some embodiments, the message encoding component 550 can generate a programming message formatted as a "smaller" or "larger" multi-portion message, having the necessary characteristics (e.g., sequential ordering, portion identifiers, first message portion (if applicable)) to facilitate the storing of the modified or updated pieces of data to the machine control system via the machine interfacing device. In various embodiments, the message can be a request message, a programming message, or any other message that can correspond to a programming function determined compatible with the machine or control system thereof based on the unique identifier associated therewith. In various embodiments, the message encoding component 550 can send a generated or encoded message to the client device, so that the client device can wirelessly communicate the message to the machine control system via the machine interfacing device.

Figure 6:
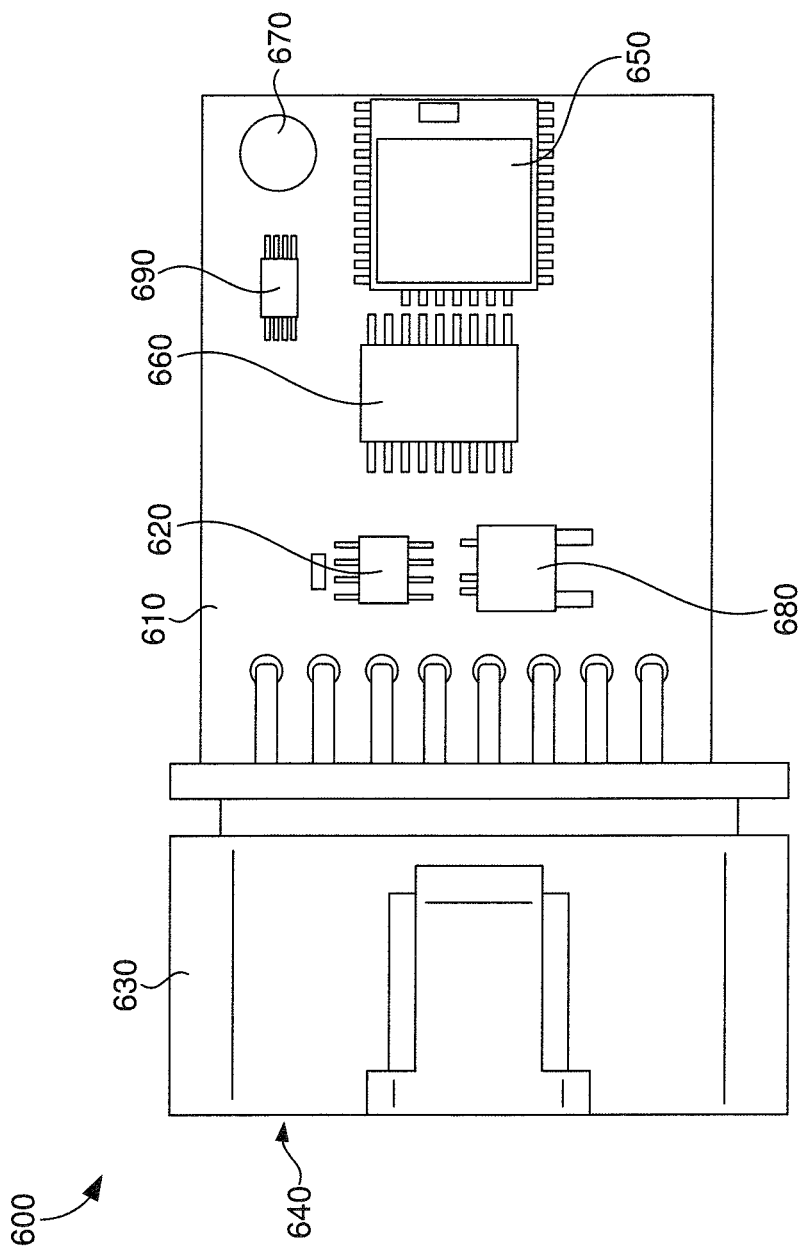
FIG. 6 is a perspective view of an exemplary circuit board of a machine interfacing device in accordance with some embodiments of the present invention.

Looking now to FIG. 6, a perspective view is provided depicting an exemplary circuit board 610 of a machine interfacing device 600, such as machine interfacing device 310 of FIG. 3, in accordance with some embodiments of the present invention. The depicted circuit board 610 is not intended to be limiting, and is only presented as an exemplary embodiment of a build configuration that may be employed within the purview of the present disclosure. In some embodiments, the circuit board 610 can be encased with a cover (not shown) comprising a rigid material, such as a polymer or polymer blend, among other things. The circuit board can be coupled to a "plug" 630-640 that comprises a first portion 640 (e.g., a male end) of a coupling connector (e.g., an OBD-II connector). The first portion 640 of the coupling connector can physically interface with a complementary second portion (e.g., a diagnostics port, female end) of the coupling connector in communication with a network bus of a machine, such as any of machines 115a-d. In some embodiments, the first portion 640 can include a set of pins (not shown) that can interface with receiving holes of the complementary second portion. The first portion 640 of the coupling connector can be at least partially covered with an insulated casing 630 comprising a rigid material (e.g., a polymer or polymer blend) that also interfaces with the complementary second portion (e.g., a female end) of the machine's coupling connector. In some embodiments, the pins of the first portion 640 can be coupled to the circuit board 610 to facilitate communications generated by any one or more of the components of the circuit board 610.

The machine interfacing device 600 can include, among other things, a diode regulator 620 that can receive, via at least a portion of the pins, electric power from a battery of the machine. The diode regulator 620 can modify the voltage level (e.g., 12V) of the received electric power from a received first voltage to a second voltage (e.g., 5V) that is compatible with the machine interfacing device 600. In this way, the diode regulator 620 can step down the electric power received from the machine's battery to effectively provide power to the machine interfacing device 600. In some embodiments, the machine interfacing device 600 can be automatically powered on upon an established coupling of the first portion 640 to the complementary second portion of the machine. In some other embodiments, a power switch (not shown) can selectively facilitate an electric coupling between the machine interfacing device 600 and the battery of the machine.

In some embodiments, the machine interfacing device 600 can include at least one processor 650, which can include one or more Internet of Things (IoT) chips or modules, such as a BGM111A256V2 chip manufactured by Silicon Labs, by way of non-limiting example. In some embodiments, the processor 650 can include at least one communications component or module that facilitates wireless communications (e.g., Bluetooth, LoRa, Wi-Fi direct, ZigBee, RF, IR) with one or more remote computing devices. In some embodiments, the at least one processor 650 can be coupled to a NFC chip 690, that can facilitate short-range wireless communications with remote computing devices. In some aspects, the NFC chip 690 can facilitate easy pairing operations (e.g., to establish secure wireless communications sessions) with a remote computing device, such as client device 410 of FIG. 4. It is contemplated that the communications module(s) can be embedded in, or separate from but coupled to, the at least one processor 650 in accordance with some embodiments. In some embodiments, the at least one processor 650 can further include or be coupled to a memory (not shown), which can facilitate at least one of temporary or persistent storage. In some further or alternative embodiments, the circuit board 610 can be coupled to a memory device port (not shown) that can receive a memory drive (not shown), such as a flash memory drive, to facilitate at least one of the temporary or persistent storage operations.

In various embodiments, the at least one processor 650 can be coupled to a network bus controller 660, such as network bus controller component 360 of FIG. 3. As at least partially described in accordance with FIG. 3, the at least one processor 650 and network bus controller 660 can convert a message or each portion thereof into signals that are compatible with the network bus of the machine control system. In essence, the network bus controller 660 implements a programmed or defined set of rules (e.g., compatible with the predefined communications standard or protocol associated with the machine control system). For instance, the message or message portion(s) received from a remote computing device, such as client device 410 of FIG. 4, can be received in a digital format. As communications sent or received via the network bus of the machine control system may require that messages or message portions be communicated utilizing an alternative format specific to the machine or network bus thereof, the network bus controller 660 can convert a message or portions thereof from the digital format to the alternative format, or from the alternative format to the digital format (e.g., if received from the machine control system via the network bus). In some embodiments, the network bus controller component 660 can be coupled to a crystal module 670 that can further facilitate the conversion of the digital format to the alternative format, and vice versa, such that the communications are compatible with the network bus of the machine. In some embodiments, the crystal module 670 can have a defined or definable frequency that corresponds to a communications frequency of the network bus. In some further embodiments, network bus controller component 660 can be coupled to a network bus transceiver 680 that interfaces between the network bus controller component 660 and the physical wires of the network bus lines via the pins of the coupling connector described herein. In various embodiments, the network bus controller 660 can employ a memory buffer or cache of the memory to store messages communicated to and/or from the machine control system; parse and interpret messages or portions thereof to determine requirements for managing communications with the machine control system; manage the receipt, sending, and/or timing of messages (or message portions) to and/or from the machine control system based on the determined requirements; monitor the communications (e.g., each communicated message or message portion), memory buffer, or cache of the memory to determine when communications are completed; among other things. In various embodiments, the network bus controller 660 can include definable logic embedded or stored in a memory to facilitate reliable and consistent delivery of wireless communications between a machine control system and a remote client device, such as client device 410 of FIG. 4.

Figure 7:
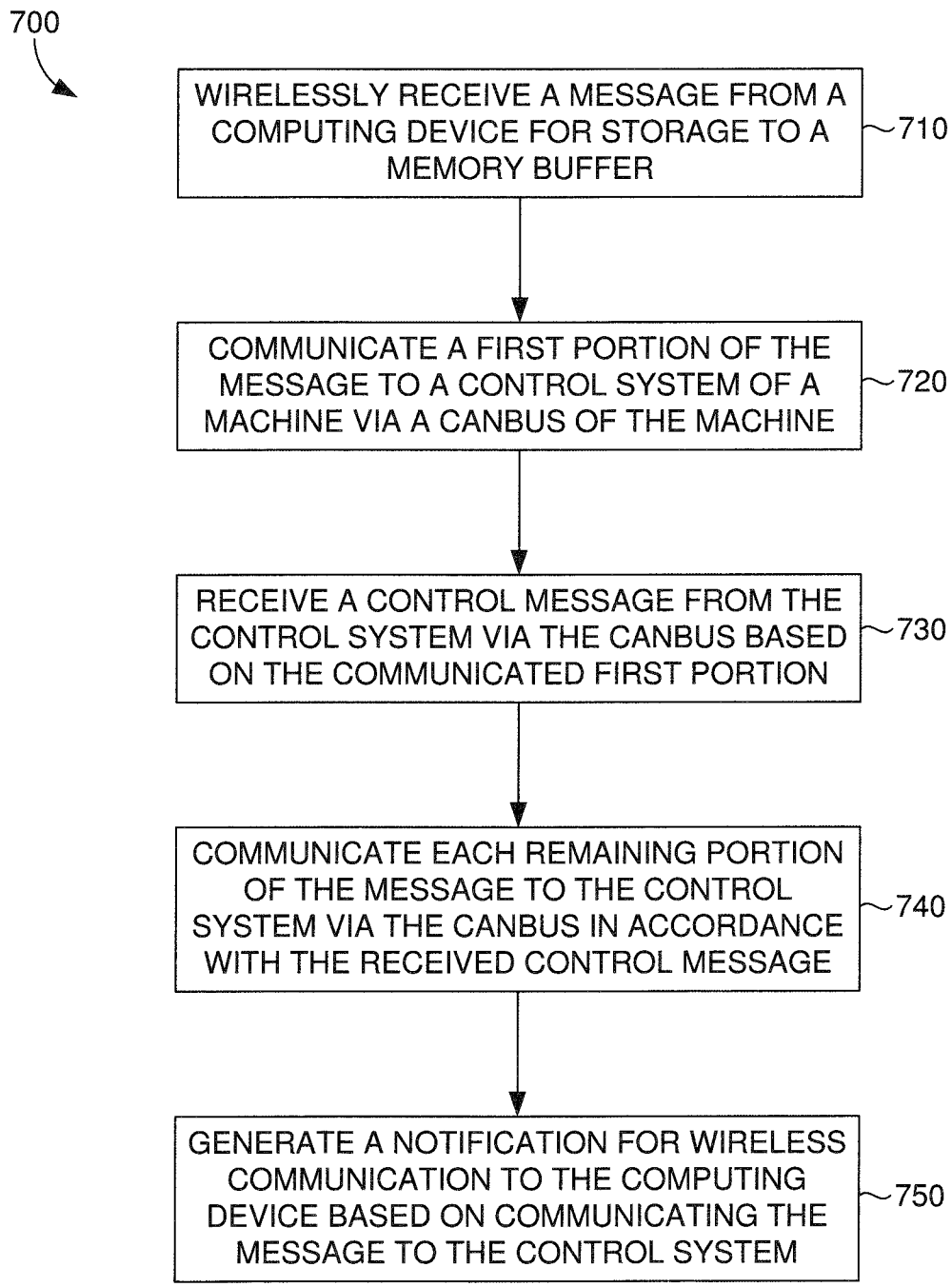
FIG. 7 is a flow diagram showing an exemplary method for wirelessly programming a control system of a machine in accordance with some embodiments of the present invention.

Turning now to FIG. 7, a flow diagram is provided that illustrates a method for wirelessly programming a control system of a machine, in accordance with some embodiments described herein. A machine interfacing device, such as machine interfacing device 310 of FIG. 3, can be physically coupled to, and in some instances powered by, a control system of a machine via a network bus of the machine. The machine interfacing device can be coupled to a diagnostics port (e.g., an OBD-II port) of the machine.

At step 710, a machine interfacing device, such as machine interfacing device 310 of FIG. 3, can wirelessly receive a message (e.g., a "larger" message) from a remote computing device, such as client device 410 of FIG. 4. In various embodiments, the machine interfacing device can be paired to the remote computing device such that a secure wireless communications session is established there between. The machine interfacing device can store the received message into a memory buffer or cache. In some aspects, the machine interfacing device can generate and send a wireless confirmation signal to the remote computing device. In some embodiments, the machine interfacing device can convert any portion of the received or stored message at any time, such as upon receipt, upon storage thereof, or just prior to communication of any portion of the message to a control system of the machine to which the machine interfacing device is physically coupled.

At step 720, the machine interfacing device can communicate, via a physical connection to a network bus of the machine, a first portion of the stored message. It is contemplated that any portion of the message is converted to a format that is compatible with the network bus of the machine before, or as it is communicated to the network bus. In some aspects, the conversion or formatting can include the modification of the message into portions that are less than a threshold size, associating each portion with a corresponding portion identifier, injecting communication attributes or requirements into one or more portions, or injecting other portion attributes into one or more portions, among other things. In some embodiments, the machine interfacing device can remove or flag any or each portion of the message based on the communication thereof over the network bus.

At step 730, the machine interfacing device can receive a flow control message from the control system, via the physical connection thereto, as a response to the communicated first portion of the message. The machine interfacing device can convert the received flow control message into a format (e.g., digital) to which it can analyze the received flow control message. The machine interfacing device can parse and analyze the flow control message to determine requirements defined by any portion (e.g., one or more ECUs) of the control system to properly communicate the message or remaining portions thereof to the respective portions of the control system via the network bus. By way of non-limiting example, the received flow control message can include information that identifies itself as a flow control message and/or defines requirements (e.g., time intervals) to communicate a remainder of the message, among other things.

At step 740, the machine interfacing device can, based on determining the requirements defined in the received flow control message, communicate each remaining portion of the message to the machine control system via the network bus. As noted herein, each remaining portion can be converted by the machine control system prior to storage or communication thereof to the machine control system. The machine interfacing device can communicate each remaining portion in accordance with the requirements determined from the received flow control message, such that the control system can properly and reliably receive the message and/or message portion(s) from the machine interfacing device (i.e., without reliance on continued communications with the remote computing device). In some embodiments, the machine interfacing device can remove or flag each communicated portion of the message from storage based on the communication thereof to the control system via the network bus.

At step 750, the machine interfacing device can determine that the message or portions thereof was successfully communicated to the machine control system. In some aspects, the machine control system can send an acknowledgment message to the machine interfacing device as a confirmation. In some other aspects, the machine interfacing device can independently determine that the message or the portions thereof was successfully communicated to the machine control system based on determining that the memory buffer is empty, or that each portion of the message is flagged as being communicated to the machine control system via the network bus. In this regard, the machine interfacing device can generate a notification based on determining that the message in its entirety was successfully communicated to the machine control system. The machine interfacing device can wirelessly communicate the generated notification, indicating that the message was successfully communicated to the machine control system, to the remote computing device via the wireless communications session established therewith.

Figure 8:
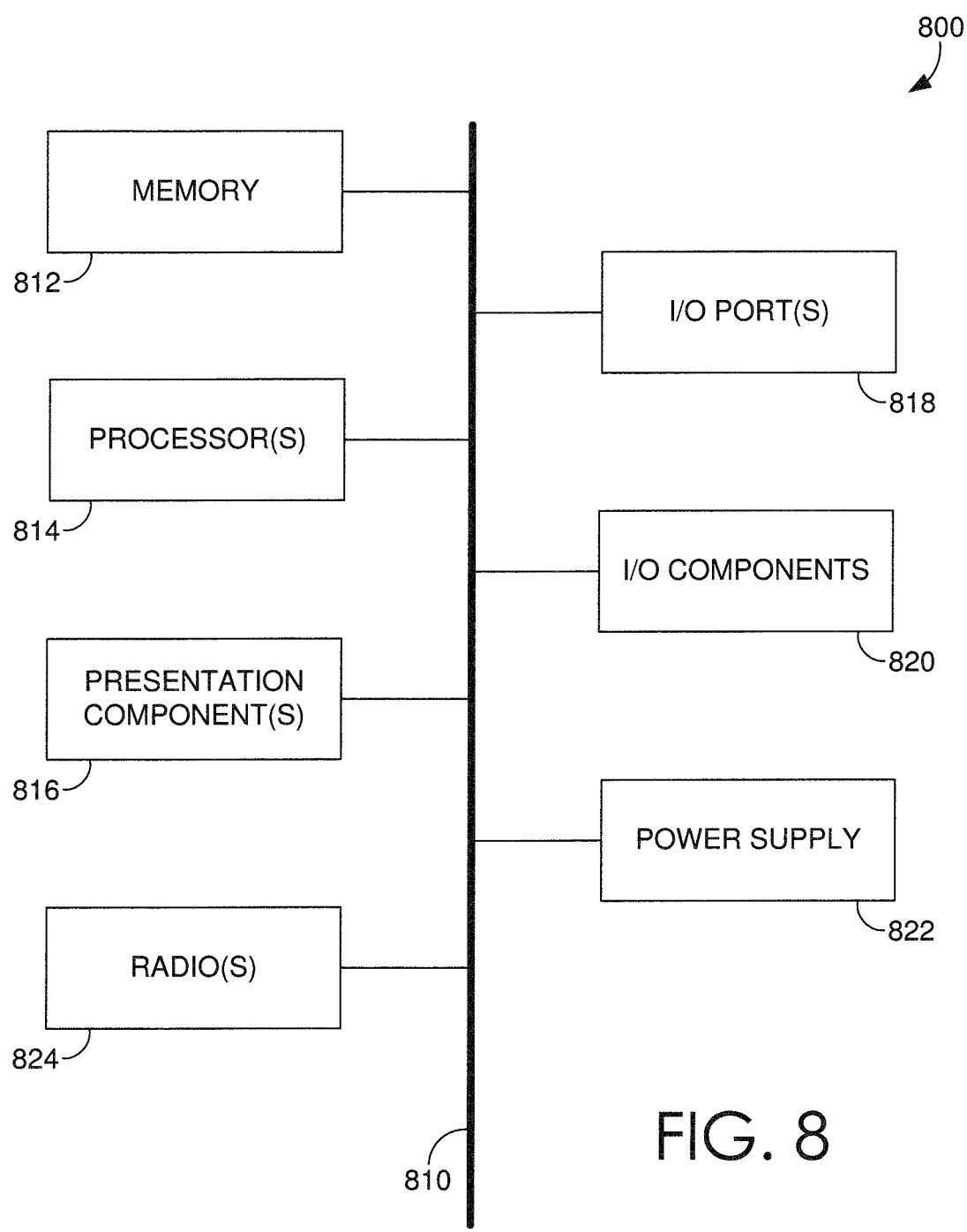
FIG. 8 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

In some embodiments, a machine interfacing device, such as one described in accordance with various embodiments herein, can facilitate real-time diagnostics and/or reprogramming of a machine control system or portions thereof. By way of example, a client device, such as client device 410 of FIG. 4, can further include a location determining component, such as a GPS module or other location determining module that can continuously determine a location of the client device at any given time. In some aspects, the GPS module can be employed to determine a first velocity of the client device at any given time. The client device can be wirelessly paired to a machine interfacing device described in accordance with various embodiments. The machine interfacing device, being physically coupled to and connected to the control system of a machine (e.g., a vehicle), can be programmed to continuously receive a second velocity of the machine at any given time. It is contemplated that the second velocity is determined by one or more portions of the control system associated with the machine, based on one or more particular parameters (e.g., tire size) programmed therein. In this regard, provided that the paired client device and machine interfacing device are travelling together in the moving vehicle, the client device can compare the independently-determined first velocity to the determined second velocity received from the control system via the machine interfacing device. The client device, determining a discrepancy between the first and second velocities, can calculate an adjusted parameter setting corresponding to the particular parameters (e.g., tire size). In some embodiments, the client device can generate a prompt for display, to request a confirmation to generate a programming message to adjust the particular parameters based on the determined discrepancy. In some other embodiments, the client device can automatically generate the programming message to adjust the particular parameters based on the determined discrepancy. In various embodiments, the client device and machine interfacing device can facilitate automated adjustments to any number of parameters stored by a machine control system based on information that can be determined by any combination of the client device and machine interfacing device, such as the example provided herein above. The above example is provided as a non-limiting example, and is described as one beneficial use of the system described herein.

As can be understood, embodiments of the present invention provide for, among other things, wirelessly programming a control system of a machine. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for wirelessly updating a control system of a machine, the method comprising:
   receiving, by a client device in communication with a controller area network (CAN bus) of the machine, a calculated velocity of the machine from an electronic control unit (ECU) in coupled communication with the CAN bus, wherein the calculated velocity is determined based at least in part on a tire parameter having a first value programmed in a memory of the ECU;
   when the calculated velocity is received, determining, by the client device, an actual velocity of the machine based on real-time location information received from a GPS module coupled to the client device;
   responsive to the calculated velocity being received and the actual velocity being determined, determining, by the client device, a discrepancy between the calculated velocity and the actual velocity;
   based on the determined discrepancy, generating, by the client device, a programming message for the ECU, the programming message including a second value for the tire parameter that is calculated based on the calculated velocity, the actual velocity, and the first value; and
   updating, by the client device, the tire parameter from the first value to the second value based on communication of the programming message to the ECU via the CAN bus.

2. The method of claim 1, wherein the machine includes one of an automobile, a motorcycle, an airplane, a tractor, a truck, construction equipment, heavy machinery, a robot, a hydraulic machine, or other vehicle.

3. The method of claim 1, wherein the ECU and the client device are in communication via a machine interfacing device.

4. The method of claim 3, wherein the machine interfacing device is coupled to the ECU via the CAN bus of the machine.

5. The method of claim 4, wherein the client device is separate from the machine and is coupled to the machine interfacing device via a wireless connection.

6. The method of claim 1, further comprising:
   based on the determined discrepancy, providing for display, by the client device, a prompt that requests a confirmation to generate the programming message.

7. The method of claim 1, wherein the tire parameter is updated automatically based on the determined discrepancy and the calculated second value.

8. A non-transitory computer storage medium storing computer-useable instructions that, when used by a computing device, cause the computing device to:
   receive, via a controller area network (CAN bus) of a machine, a calculated velocity of the machine from an electronic control unit (ECU) that is in coupled communication with the CAN bus, wherein the ECU and the computing device are in communication via a machine interfacing device and the calculated velocity is determined based at least in part on a tire parameter having a first value programmed in a memory of the ECU;

when the calculated velocity is received, determine an actual velocity of the machine based on real-time location information received from a GPS module coupled to the computing device;

responsive to the calculated velocity being received and the actual velocity being determined, determine a discrepancy between the calculated velocity and the actual velocity;

based on the determined discrepancy, generate a programming message for the ECU, the programming message including a second value for the tire parameter that is calculated based on the calculated velocity, the actual velocity, and the first value; and update the tire parameter from the first value to the second value based on communication of the programming message to the ECU via the CAN bus.

9. The medium of claim 8, wherein the machine includes one of an automobile, a motorcycle, an airplane, a tractor, a truck, construction equipment, heavy machinery, a robot, a hydraulic machine, or other vehicle.

10. The medium of claim 8, further comprising:
based on the determined discrepancy, present a prompt that requests a confirmation to generate the programming message.

11. The medium of claim 8, wherein the tire parameter is updated automatically based on the determined discrepancy and the calculated second value.

12. The medium of claim 8, wherein the machine interfacing device is coupled to the ECU via the CAN bus of the machine.

13. The medium of claim 12, wherein the computing device is separate from the machine and is coupled to the machine interfacing device via a wireless connection.

14. A system comprising:
a machine interfacing device having at least one processor and a computer storage medium storing computer-useable instructions that, when used by the at least one processor, cause the at least one processor to:

retrieve, via a controller area network (CAN bus) of a machine, a calculated velocity of the machine from an electronic control unit (ECU) in coupled communication with the CAN bus, wherein the calculated velocity is determined based at least in part on a tire parameter having a first value programmed in a memory of the ECU;

wirelessly communicate the calculated velocity to a client device that is separate from the machine, wherein the client device is configured to calculate a second value for the tire parameter based on an actual velocity of the machine, the calculated velocity of the machine, and the first value;

wirelessly receive a programming message for the ECU from the client device based on the second value being calculated, the programming message including the second value; and causing the tire parameter programmed in the memory of the ECU to be updated from the first value to the second value based on communication of the programming message to the ECU via the CAN bus.

15. The system of claim 14, wherein the ECU and the client device are in wireless communication with one another via the machine interfacing device.

16. The system of claim 14, wherein the machine interfacing device is physically coupled to the ECU via the CAN bus of the machine.

17. The system of claim 14, wherein the client device is in coupled communication with the machine interfacing device via a wireless connection.

18. The system of claim 14, wherein the machine includes one of an automobile, a motorcycle, an airplane, a tractor, a truck, construction equipment, heavy machinery, a robot, a hydraulic machine, or other vehicle.

19. The system of claim 14, wherein the actual velocity is determined based on real-time location information received from a GPS module coupled to the client device.

* * * * *